(12) United States Patent
Alfakhrany

(10) Patent No.: US 12,196,250 B2
(45) Date of Patent: Jan. 14, 2025

(54) FIXING DEVICE

(71) Applicant: Rhino Rack Australia Pty Limited, Eastern Creek (AU)

(72) Inventor: Tarek Alfakhrany, Eastern Creek (AU)

(73) Assignee: Rhino Rack Australia Pty Limited, Eastern Creek (AU)

( * ) Notice: Subject to any disclaimer, the term of this patent is extended or adjusted under 35 U.S.C. 154(b) by 436 days.

(21) Appl. No.: 17/844,316

(22) Filed: Jun. 20, 2022

(65) Prior Publication Data

US 2022/0403864 A1    Dec. 22, 2022

(30) Foreign Application Priority Data

Jun. 18, 2021   (AU) ................................ 2021901841

(51) Int. Cl.
*F16B 7/20*   (2006.01)
*F16B 7/04*   (2006.01)

(52) U.S. Cl.
CPC .......... *F16B 7/0493* (2013.01); *F16B 7/0433* (2013.01); *F16B 7/20* (2013.01); *F16B 2200/10* (2018.08); *F16B 2200/40* (2018.08)

(58) Field of Classification Search
CPC .. F16B 7/0493; F16B 7/20; F16B 7/18; F16B 7/0433; F16B 2200/10; F16B 2200/40; F16B 21/02; F16B 37/04; F16B 39/282
See application file for complete search history.

(56) References Cited

U.S. PATENT DOCUMENTS 4,545,697 A    10/1985  Verdenne
5,067,863 A    11/1991  Kowalski
(Continued)

FOREIGN PATENT DOCUMENTS

DE    19821255 A1    11/1999
EP    0805297 A2    11/1997
(Continued)

OTHER PUBLICATIONS

International-Type Search Report and Written Opinion, by IP Australia, dated Mar. 15, 2022, regarding AU Application No. 2021901841.
(Continued)

*Primary Examiner* — Daniel J Wiley

(57) ABSTRACT

The present invention relates to, in a first aspect, a fixing device comprising an anchor element that is positioned along an axis, the anchor element extending substantially perpendicular thereto, a rotating element arranged perpendicular to and rotatable about the axis, and spaced therealong from the anchor element, and a deployment mechanism, comprising a first deployment portion on the anchor element and a second deployment portion on the rotating element, wherein one of the first and second deployment portions comprise a sloping surface extending at least partway around the axis, and the other is shaped to be able to roll, slide or otherwise move along the sloping surface, the anchor element and rotating element are able to move towards one another along the axis, and the deployment mechanism is adapted to convert movement of the anchor element and rotating element towards one another into helical movement in a first-handed direction along and about the axis. Also provided are a fixing device for fixing an article to a structure, a system comprising a fixing or fastening device, and a method of using a fixing device.

33 Claims, 16 Drawing Sheets

(56) References Cited

U.S. PATENT DOCUMENTS

| | | | | |
|---|---|---|---|---|
| 5,209,619 | A | * | 5/1993 | Rinderer ............... F16B 37/045 |
| | | | | 411/85 |
| 5,655,865 | A | * | 8/1997 | Plank .................... F16B 37/045 |
| | | | | 403/258 |
| 7,073,995 | B2 | * | 7/2006 | Herb ..................... F16B 37/046 |
| | | | | 411/114 |
| 7,137,768 | B2 | * | 11/2006 | Maas ...................... F16B 35/06 |
| | | | | 411/340 |
| 2009/0087282 | A1 | | 4/2009 | Van Walraven |
| 2017/0136936 | A1 | | 5/2017 | Raymond |

FOREIGN PATENT DOCUMENTS

| | | |
|---|---|---|
| EP | 1775482 A1 | 4/2007 |
| EP | 3822495 A1 | 5/2021 |
| WO | 2018/153928 A1 | 8/2018 |
| WO | 2018/153931 A1 | 8/2018 |
| WO | 2020/096447 A1 | 5/2020 |
| WO | 2020/171709 A1 | 8/2020 |

OTHER PUBLICATIONS

International Search Report, mailed Aug. 31, 2022, by the ISA/AU, regarding International Application No. PCT/AU2022/050623.
Written Opinion, mailed Aug. 31, 2022, by the ISA/AU, regarding International Application No. PCT/AU2022/050623.

* cited by examiner

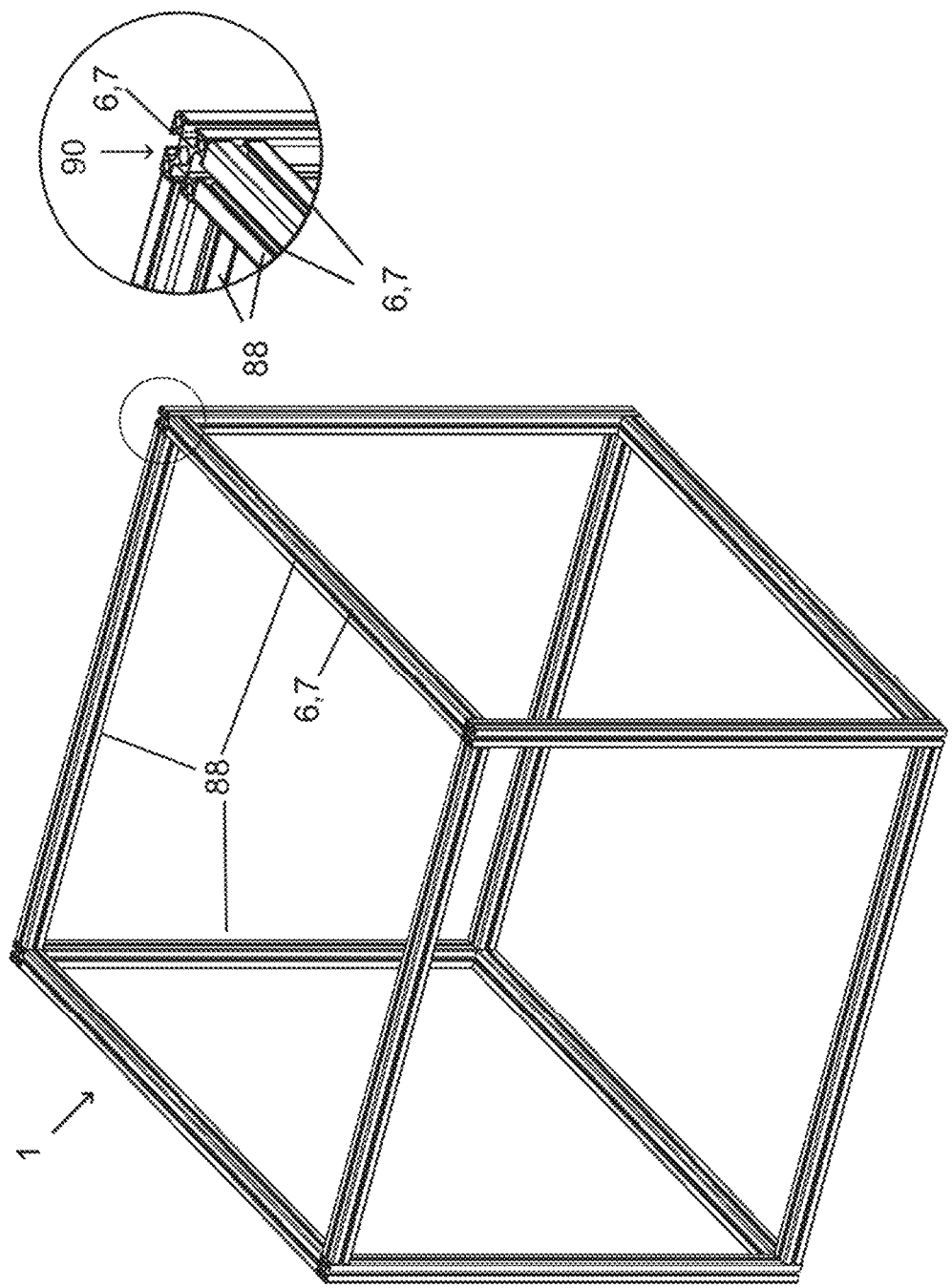

FIXING DEVICE

PRIORITY DETAILS

The present application claims priority from AU 2021901841, filed in Australia on 18 Jun. 2021, the entirety of which is incorporated herein by reference for all purposes.

TECHNICAL FIELD

The present invention relates generally to the field of mechanical fastening means.

BACKGROUND

Mounting channels are a well-known mounting system—a "channel nut" within a mounting channel allows for an article to be bolted thereto, with the channel allowing for the article's position to be changed by sliding the channel nut therealong. However the channel nut must be wider than the flanges of the mounting channel to ensure that it can urge against the flanges and be held in place. Prior art systems therefore required a means of inserting the channel nut into the channel.

Certain prior art systems, such as that disclosed in AU 2011286169, utilised widened apertures spaced along a channel, the aperture permitting a channel nut to be inserted into the channel. However this requires specialised machinery to cut or otherwise shape the apertures into the channel structure. This is problematic when a channel is part of an extruded structure; typical extrusion processes do not easily allow for variation in an extruded product's structure along its length, necessitating additional manufacturing steps (and associated increased expenditure) to cut or shape the apertures. A further drawback to the aperture method is that channel fastening hardware must be slid along the channel from the nearest aperture and into its desired position on the rack. If there is an existing article already fixed to the channel in this path, it needs to be removed while the article is fitted and then subsequently re-fitted. This can be a time-consuming process especially if it needs to be performed regularly and/or in the field.

Other systems provided an open end to the channel, requiring that the channel nut be fed along the length of the channel to the desired position. This requires that a channel either have a permanently open end or, if the channel is incorporated into a structure's body, the structure must be able to be opened or at least partially disassembled to enable access to the channel. This carries its own host of issues in that permanently-open channel ends and openable hatches provide catchment for dirt, dust and other contaminants and can become infested with spiders and insects, particularly when the prior art system is employed off-road and/or in rural or wild environments. Routine disassembly, on the other hand, can weaken connections between components over time.

Certain channel fasteners are adapted to be inserted into a typical channel, and typically comprise a channel nut with a 'long' axis and a 'short' axis. The channel nut is inserted into the channel with the 'long' axis aligned with the channel direction. Once inserted, the channel nut can be rotated within the channel such that its 'long' axis is transverse to the channel, thus enabling the channel nut to contact with the channel flanges. However, such prior art channel nuts suffer from several deficiencies. As the skilled person will appreciate, channel nuts may often be implemented 'blind', as an accessory or other article may be resting against the channel for mounting—or the channel may be out of the user's direct line-of-sight—thereby obscuring the channel nut from the user during the fastening and tightening process. Bearing this in mind and with reference to FIG. 1A depicting a prior art channel nut P-10 (which is disclosed in U.S. Pat. No. 4,784,552) many prior art rotatable channel nuts rely upon the fastener P-12 (such as a threaded bolt) to drive rotation. Insufficient friction between the channel nut P-10 and the fastener P-12, the channel nut catching on something within the channel P-14, or other such hindrances, may prevent such a prior art channel nut P-10 from rotating properly. A 'blind' implementation of such a channel nut P-10 may result in the user not identifying that said channel nut is under-rotated or over-rotated, leading to potential improper fixing.

Many prior art fixing devices such as channel nut P-10 may also be reliant upon a channel P-14 having inwardly-curved flanges P-16. While said inwardly-curved flanges may ameliorate the risk of over-rotation by cooperating with a protrusion on the channel nut P-10, damage to said flanges P-16, or a channel formed without said curved flanges P-16 (e.g. the flanges are straight and parallel to one another) would potentially be unable to properly and suitably receive a prior art channel nut P-10.

Additionally—and with reference to FIG. 1B depicting a further prior art fixing device P-20 comprising a channel bolt and associated nut, as disclosed in AU 2020101180—while a prior art fixing device P-20 may be inserted into a channel and rotated by the fastener before tightening said fastener, there may be no structural element or other means to ensure that during said tightening process the fixing device P-20 will remain in the correct configuration. Prior art rotatable fixing devices similar to fixing device P-20 are therefore prone to either or both of under-rotation or over-rotation, risking loss of contact between the channel nut and the channel flanges. Movement of the article or mounting surface may also lead to 'jostling', which may loosen prior art fixing device P-20—which is undesirable.

Prior art fixing devices similar to those depicted in FIGS. 1A & 1B may also need to be rotated into the correct configuration during insertion and before an accessory is positioned for mounting. This may further exacerbate the risk of the fixing device rotating out of position, driven by friction as the threaded fastener engages therewith.

FIG. 1C depicts a further prior art deployable fixing device comprising a channel nut P-30, as disclosed in EP 3822495. Prior art channel nut P-30 attempts to address the risk of the rotating portion P-32 over- or under-rotating by employing a spacer element P-34, stop element P-36 and receptacle P-38. However, all lateral rotation of the rotating portion P-32 is directly driven by rotation of the associated screw, and so the aforementioned problems are not fully addressed.

Still other designs relied upon spring-loaded mechanisms, increasing the complexity of the fixing device. One such example is depicted in FIG. 1D (as disclosed in EP 0805297), which shows a prior art channel nut P-40 having spring elements P-42 used to drive rotation of a rotating portion P-44 relative to the mounting plate P-46. The spring element P-42 also pulls the rotating portion P-44 and mounting plate P-46 towards one another. Additionally, the design of prior art channel nut P-40 requires that in order to be 'deployed', the rotating portion P-44 must first translate away from the mounting plate P-46 in order to rotate, before being drawn back by the spring element P-42. Spring elements represent a significant point of failure in that if the spring element fails, the channel nut becomes unusable.

Furthermore, and particularly in the instance of prior art channel nut P-40, which relies upon spring element P-42 to draw the rotating portion P-44 and mounting plate P-46 towards one another, spring element failure may result in the channel nut being able to "fail open" and loosen enough for a mounted article to detach.

Prior art fixing devices that are able to be inserted into a flanged channel without a widened opening and rotated into a locking configuration are also typically designed with an upper plate that sits against the outer surface of the slot flanges (See, e.g., FIGS. 1A, 1C & 1D), in order to provide leverage and/or bracing against which the channel nut could be pulled snugly against the inner surface of the flanges. These upper plates can interfere with how an article is mounted to the channel, particularly if the attachment point on the article is not formed with the upper plate in mind, resulting in the article not sitting flush against the channel. The gaps so formed can allow water, dirt and debris to accumulate, which may lead to corrosion and other damage to the article, to the channel, or to the structure within which the channel is formed or provided.

There is therefore a need to provide the ability to fasten an object to a point along a channel while overcoming or at least ameliorating the disadvantages of the prior art means.

DISCLOSURE OF THE INVENTION

In a first aspect, the present invention relates to a fixing device comprising an anchor element that is positioned along an axis, the anchor element extending substantially perpendicular thereto, a rotating element arranged perpendicular to and rotatable about the axis, and spaced therealong from the anchor element, and a deployment mechanism, comprising a first deployment portion on the anchor element and a second deployment portion on the rotating element, wherein one of the first and second deployment portions comprise a sloping surface extending at least partway around the axis, and the other is shaped to be able to roll, slide or otherwise move along the sloping surface, the anchor element and rotating element are able to move towards one another along the axis, and the deployment mechanism is adapted to convert movement of the anchor element and rotating element towards one another into helical movement in a first-handed direction along and about the axis.

A further aspect of the invention may provide a fixing device for fixing an article to a first side of a slot formed by substantially opposing flanges, the fixing device comprising an anchoring element configured to sit within the slot and between the opposing flanges, and a rotating element that is rotatable with respect to the anchor element, the rotating element being configured to be positioned on a second side of the slot and rotate about an axis substantially perpendicular to the opposing flanges, wherein the anchor element and rotating element each have a width less than or equal to a width of the slot, and the rotating element has a length greater than the width of the slot, the anchor element and rotating element are able to move towards one another in a tightening movement along the axis, the fixing device is shiftable between an insertion configuration in which the anchor element and rotating element are arranged such that their widths are aligned, and a deployed configuration in which the rotating element is rotated away from alignment with the anchor element, and the fixing device further comprises a deployment mechanism configured to convert the tightening movement between the rotating element and the anchor element into rotation of the rotating element towards the deployed configuration.

A further aspect of the invention may provide a method of fixing an article to a slot having a slot width and being formed by substantially opposing flanges, the slot and flanges having a first side and a second side, the method comprising the steps of:
1. providing a fixing device comprising an anchor element arranged perpendicular to an axis, a rotating element mechanically connected thereto and rotatable about the axis, and a deployment mechanism;
2. inserting the fixing device in an insertion configuration through the slot from the first side and at least partially to the second side; and
3. inducing the anchor element and rotating element to move towards one another along the axis;

wherein the anchor element and rotating element have widths less than or equal to the slot width, and the rotating element has a length greater than the slot width, the insertion configuration comprises the anchor element and rotating element being arranged along the axis such that their widths are aligned, and the deployment mechanism is adapted to convert movement of the anchor element and rotating element towards one another into helical movement in a first-handed direction along and about the axis.

A further aspect of the invention may provide a system for securing an attachment having an opposable surface to a structure having a slot with an opening disposed along a longitudinal axis, said opening being at least partly bounded by at least one portion of said structure that juts substantially transversely toward said longitudinal axis, the system comprising a fastening device having a securing element and a constraining element, wherein the securing element has a first and second diameter orthogonal to one another and substantially orthogonal to a common axis that is substantially orthogonal to the longitudinal axis, the securing element comprising a surface for stressing the at least one jutting portion between said surface and the opposable surface of the attachment, and the constraining element comprises a first and second portion, the first portion of the constraining element being engageable with the slot such that, in use, rotation of the constraining element relative to the slot and about the common axis is substantially constrained, a first conversion mechanism consisting of a first portion of the attachment and a first portion of the securing element, wherein the first attachment portion engages with, and is rotatable relative to, the first securing element portion about the common axis when the fastening device is received in the slot, and a second conversion mechanism consisting of a second portion of the securing element and a second portion of the constraining element, wherein the second securing element portion is able to engage with, and is rotatable about the common axis relative to, the second constraining element portion, the two conversion mechanisms each being adapted to convert rotational motion and lineal motion along the common axis, wherein the fastening device is configured to be reversibly transformable between a releasable configuration wherein the fastening device is able to be inserted into and/or withdrawn from the slot, and a deployed configuration, wherein, when the fastening device is received in the slot, the jutting portion is stressed between the surface of the securing element and the opposable surface of the attachment, the first and second conversion mechanisms cooperate to enable transformation from the releasable configuration to the deployed configuration, a first variable distance extends, parallel to the common axis, between the securing element surface and the opposable surface of the attachment when said securing element and attachment are engaged, a second variable distance extends, parallel to the common axis, between the securing element surface and the constraining element, and a variable angle is formed between the first diameter of the securing element and the longitudinal axis, further wherein rotation of the first conversion mechanism in a first handed direction induces a first relative linear motion between the attachment and the securing element, thereby reducing the first variable distance, the first relative linear motion induces a second relative linear motion in the second conversion mechanism, thereby reducing the second variable distance and causing the second conversion mechanism to operate, reduction of the second variable distance when the second conversion mechanism is operating induces a relative rotation of the securing element about the common axis in a second handed direction, thereby increasing the variable angle, transforming the fastening device from the releasable configuration into the deployed configuration and stressing the at least one jutting portion between the securing element surface and the opposable surface of the attachment, such that the attachment is secured to the structure.

Further embodiments of one or more aspects of the invention are disclosed herein, and alternative embodiments may become apparent to the person skilled in the art through the disclosure contained herein. These and other embodiments are considered to fall within the scope of the invention as disclosed.

DESCRIPTION OF FIGURES

Embodiments of the present invention will now be described in relation to figures, wherein:

FIGS. 17-20 depict various non-limiting examples of applications of embodiments of the present invention.

DEFINITIONS

As used herein, the term "face cam" refers to a mechanism consisting of two operable parts, namely a cam and a follower. The cam has an axis of rotation, and a surface that is oblique to the axis of rotation. The follower is configured to contact the surface such that upon rotation of the cam about the axis, the follower is induced by said contact, due to its oblique nature, to undergo a lineal motion at least partly parallel to the axis. Usually, the follower is configured to undergo a lineal motion parallel to the axis. The follower may consist of a reciprocal surface. Further description of face cams is provided under the section entitled: "Shifting into the Deployed Configuration".

As used herein, the term "Lead" refers to, for mechanisms that convert lineal and handed rotational motion along/about an axis, the advance along the axis that corresponds to a single revolution about the axis. It will be appreciated that for mechanisms that cannot undergo a single revolution, the lead is calculated from the differential relationship between advance and rotation.

DETAILED DESCRIPTION OF PREFERRED EMBODIMENTS

The subject headings used in the detailed description are included only for the ease of reference of the reader and should not be used to limit the subject matter found throughout the disclosure or the claims. The subject headings should not be used in construing the scope of the claims or the claim limitations.

The terminology used herein may differ across different embodiments. Accordingly, terms introduced in the detailed description may be expressed in two or more alternative forms for cross-reference. The use of alternative expressions reflects that the same or similar features are able to be described in more than one manner, and is not intended to limit features described as such to being exclusive to any one particular embodiment, nor is it intended to limit any of the embodiments disclosed herein to comprising or excluding any particular features by virtue of what term is used to identify them.

The skilled person will further appreciate that—unless otherwise expressly indicated to the contrary—the embodiments of the invention disclosed herein are not exclusive with regards to one another, and features of one embodiment may be incorporated into another. Similarly, simply because a particular embodiment does not expressly describe a particular feature as being present is not to be read as indicating that said particular feature is absent or otherwise excluded from the particular embodiment.

Figure 2A:
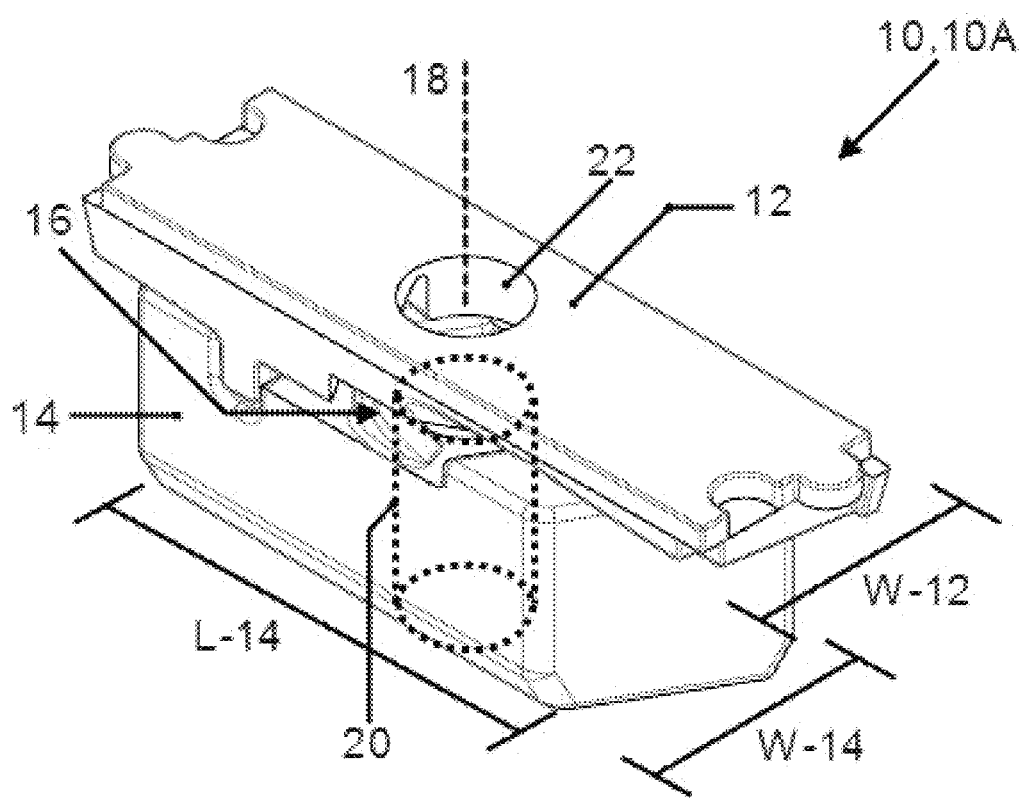
FIGS. 2A & 2B depict an embodiment of a fixing device of the present invention.
Figure 2B:
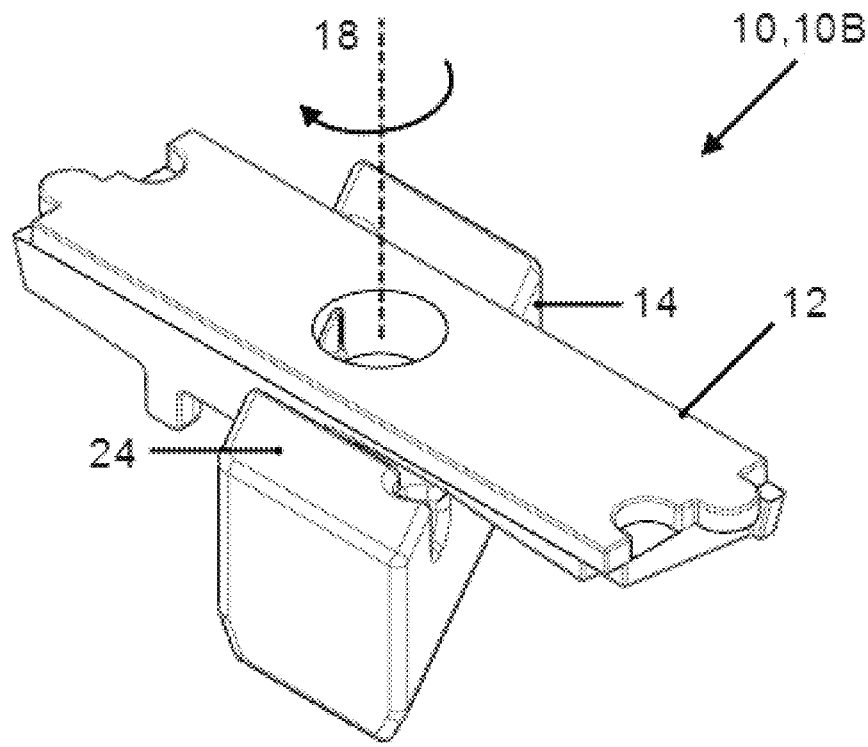
Figure 3:
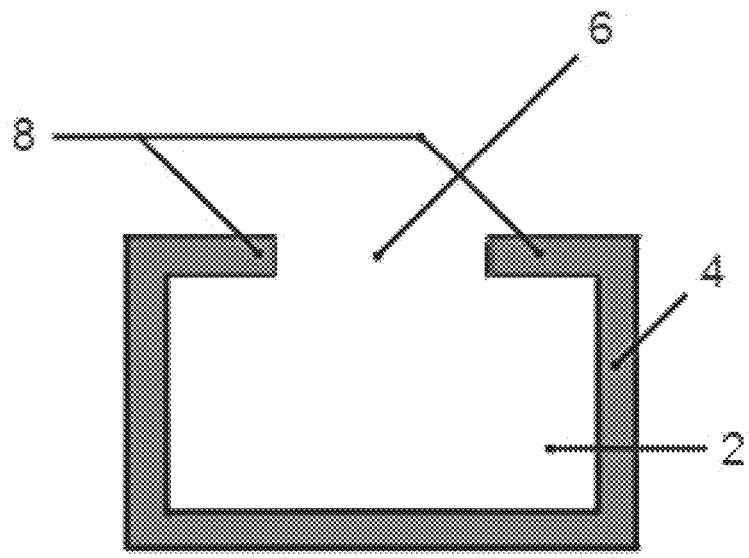
FIG. 3 depicts an example of a C-shaped channel.

In a first aspect and with reference to FIGS. 2A & 2B, the present disclosure is directed to a fixing or fastening device 10. In an embodiment and with additional reference to FIG. 3, the fixing device 10 may be used for fixing an article or attachment 3 to a structure having a longitudinally-extending slot or opening 6 and opposing flanges 8 (or at least one jutting portion or flange) on either side of the slot 6. As depicted in FIG. 3, the longitudinally-extending slot 6 may open into a channel having an internal space or interior 2 with opposing side walls 4. Alternatively, the longitudinally-extending slot 6 may simply be formed into or as part of the structure with no channel. In either alternative, the slot may not have any particular length. With reference to FIG. 3, for example, the slot 6 may extend for a length, and the fixing or fastening device 10 may enable the article or attachment 3 to be fixed at any point along said slot length.

It will be appreciated that the slot 6 or channel 7 does not need to have any particular length. The skilled person will appreciate that, as used herein, the term slot simply refers to the presence of an appropriately-configured longitudinally-extending opening having at least one flange 8. According to one use of the terminology, the structure 1 may comprise a slot 6 or a channel 7 of indefinite length. According to another use of the terminology and with reference to FIG. 4, the structure 1 may comprise a slot 6 having a definite length. As such, the skilled person will appreciate that embodiments of the fastening device 10 can be used with two different forms of structure 1, and unless otherwise explicitly noted, the disclosure herein is not to be interpreted as being limited to only one form of the structure 1.

As used herein, directional and positional terms such as lateral/longitudinal, above/below, etc. are not to be construed in an absolute manner or otherwise limiting an embodiment of the fixing device 10 described herein to a specific 'absolute' orientation, but rather should only be construed with reference to the fixing device's orientation within a structure 1. For the sake of convention only, the structure 1 may be considered to provide a frame of reference with the slot 6 positioned "above" the internal space 2 and opening "upwards". The skilled person will appreciate that embodiments of the fixing device 10 may be used in a structure 1 rotated to any suitable angle without departing from the scope of the present disclosure.

In an embodiment, the fixing device 10 comprises a locking or constraining or anchor element 12 arranged perpendicular to an axis 18 (or a common axis as will later be described), an engaging or securing or rotating element 14 mechanically connected thereto, the rotating element 14 also being perpendicular to and rotatable about the axis 18, and spaced therealong from the anchor element 12. An embodiment of the present invention also comprises a deployment mechanism or mechanism 16 (or second conversion mechanism as will later be described), comprising a first portion on a face of the anchor element facing the rotating element 17 (or a first deployment portion on the anchor element, or a first portion of the constraining element as will later be described) and a second portion on a face of the rotating element facing the anchor element 19 (or a second deployment portion on the rotating element, or second portion of the securing element as will later be described). At least one of the first and second portions 17,19 may comprise an inclined or helical or sloping surface or ramp 27 and the other is a compatible element 29 that is shaped to be able to roll, slide or otherwise move therealong (in one embodiment as a follower or reciprocal helical surface as will later be described). With reference to FIG. 2A, the second portion 19 of the deployment mechanism 16 is depicted as comprising an inclined surface, but the skilled person will appreciate that this is an example only.

In use, the anchor element 12 and rotating element 14 are able to move towards one another along the axis 18 in a tightening movement (associated with a second relative lineal motion as will later be described), for at least a portion of which the first and second portions 17,19 of the deployment mechanism 16 urge against one another.

In an embodiment, the fixing device 10 comprises an anchor element 12 that is configured to sit within the slot 6 and between the opposing flanges 8, a rotating element 14 that is configured to be positioned within the internal space 2 of the structure 1, and a deployment mechanism 16. The rotating element 14 and anchor element 12 are configured to be able to move towards one another in a tightening movement, and upon inducing the tightening movement between the rotating element 14 and the anchor element 12, the deployment mechanism 16 subsequently induces rotation in the rotating element about axis 18 (or a relative rotation in a second handed direction as will later be described). The skilled person will appreciate that the term "tightening movement", as used herein, refers solely to the anchor element 12 and rotating element 14 moving towards one another, and that the scope of the present disclosure is not limited by which element is moving. In some embodiments, the anchor element 12 may move. In some embodiments the rotating element 14 may move. In some embodiments both the locking and rotating elements 12, 14 may move.

In some embodiments, and in particular the embodiment depicted in FIG. 2A, the rotating element 14 may comprise a threaded bore 20 (or first portion of the securing element as will later be described) extending along axis 18, with a matching unthreaded bore 22 in anchor element 12. A bolt or other threaded fastener 21 (or first portion of the attachment as will later be described) may be inserted into the bore 20 to engage with the rotating element 14. In such an embodiment, the rotating element 14 may act like a nut. In alternate embodiments, rotating element 14 may be a T-bolt wherein the 'horizontal' component of the 'T' is formed by the rotating element 14, such that the threaded fastener protrudes from the rotating element and through unthreaded bore 22 in anchor element 12. In such an embodiment the T-bolt may engage with a suitably threaded nut.

Drop-In Insertion into a Slot

In an embodiment and with reference to FIG. 2A, the anchor element 12 and rotating element 14 may each have a width W-12, W-14 (or second diameter as will later be described) that is less than or equal to a predetermined width. The rotating element 14 may have a length L-14 (or first diameter as will later be described) that is greater than the predetermined width. With reference to both FIGS. 2A & 2B, in such an embodiment, the fixing device 10 may have a insertion configuration 10A, in which the anchor element 12 and rotating element 14 are positioned along the axis 18 such that their respective widths W-12, W-14 are aligned (as depicted in FIG. 2A) and the tightening movement may induce rotation of the rotating element 14 away from the insertion configuration 10A (as depicted in FIG. 2B).

The insertion configuration 10A, being alternatively referred to as an insertion configuration, may provide the present invention with the ability to be 'dropped' into any slot 6 having a suitable width and deployed therein, without requiring that the slot comprise an aperture, unlike prior art mounting systems. Additionally, the 'drop-in' ability of the present invention ameliorates the need for a slot or channel to have an open or exposed end.

The skilled person will further appreciate that in prior art arrangements, if two (or more) articles are fixed along a particular prior art slot and a further article is to be fixed at a location therebetween, then at least one of these already-fixed articles must be entirely removed so that the further article may be slid into position and fixed in place. In contrast, the 'drop-in' functionality of the present invention negates the need to unfix, detach or otherwise remove already-fixed articles in order to fix a further article to a particular slot. The skilled person will appreciate that this represents a significant advantage to users with modular or personalised arrangements of articles, such as may be found on off-road, camping or utility vehicles.

In an embodiment, the predetermined width may be a width of a slot 6 (or first transverse dimension as will later be described). In an embodiment, the widths W-12, W-14 of the anchor element 12 and rotating element 14 are less than or equal to a width of the slot 6 (being the predetermined width), while the rotating element has a length L-14 greater than the width of the slot 6.

With reference to FIG. 2A, in some embodiments the fixing device 10 comprises an insertion configuration 10A (or releasable configuration as will later be described) wherein the anchor element 12 and rotating element 14 are aligned widthwise. As such, in the insertion configuration 10A, the overall width of the fixing device 10 less than or equal to a width of the slot 6. In the insertion configuration 10A, the fixing device 10 is able to be inserted into the internal space 2 of the structure 1 directly through the slot 6, without requiring a specially-formed aperture or an open end of the channel.

With reference to FIG. 2B, in some embodiments the fixing device 10 comprises a deployed configuration 10B (or obstructible configuration as will later be described) wherein the anchor element 12 and rotating element 14 are rotated away from widthwise alignment about axis 18. In the deployed configuration 10B an upper surface 24 of the rotating element 14 (or surface of the securing element as will later be described) is positioned under the opposing flanges 8 of the channel, thereby preventing withdrawal of the fixing device 10 from the channel.

Shifting into the Deployed Configuration

In an embodiment, the fixing device 10 may comprise a deployment mechanism 16 that is configured to induce rotation in the rotating element 14. In a further embodiment, this is achieved by the deployment mechanism 16 directly converting the tightening movement between the rotating element 14 and the anchor element 12 into rotation of the rotating element 14 about axis 18.

To explain by way of non-limiting example, a tightening force is applied to one (or both) of the rotating element 14 and the anchor element 12, said tightening force being parallel to axis 18 and moving the anchor element 12 and rotating element 14 towards one another. The deployment mechanism 16 converts a portion of the applied force into a rotational force, said rotational force being substantially perpendicular to axis 18 and inducing rotation in the rotating element 14 about axis 18 (it will be understood that such an arrangement can be articulated in terms of motion, distances of motion, and angles of motion that are associated with said forces, as will later be described).

Figure 5A:
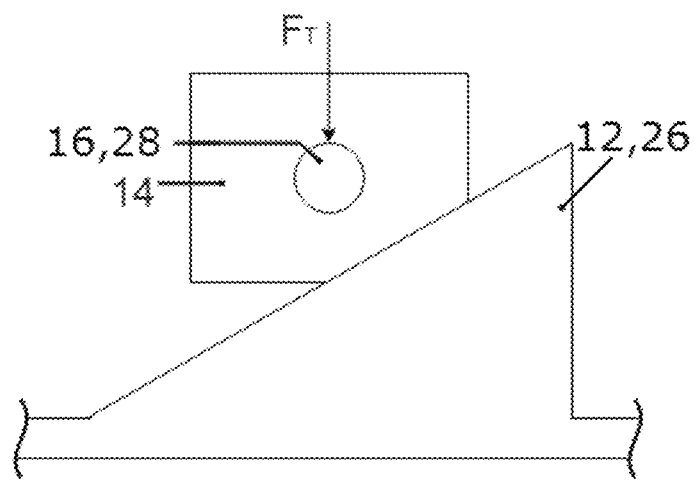
FIGS. 5A-5C & 6 illustrate the function of an embodiment of a deployment mechanism of the present invention.

This may be explained by reference to a non-limiting example depicted in FIGS. 5A-5C. In FIG. 5A, the anchor element 12 and rotating element 14 are not in engaging contact. A tightening force ($F_T$) induces the relative tightening motion, which simply moves the two elements 12,14 together and the deployment mechanism 16 (herein depicted as extending from rotating element 14, although the skilled person will appreciate that this is an example only) towards engagement. The skilled person will appreciate that in an embodiment wherein a threaded fastener 21 is utilised there may be some induced rotation of rotating element 14 by said threaded fastener 21, but as previously established this is not reliable, and so for clarity is not depicted in FIG. 5A.

Figure 5B:
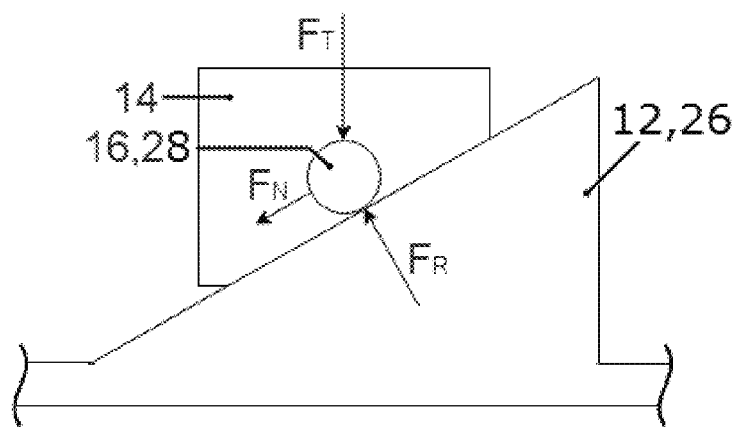
Figure 5C:
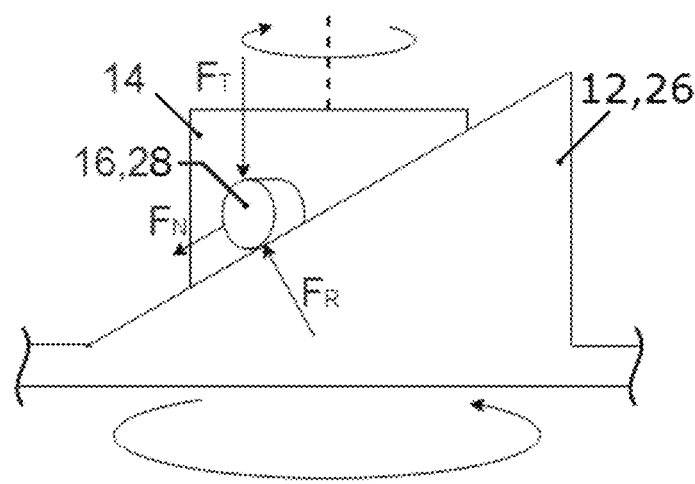

Referring now to FIG. 5B, the tightening force ($F_T$) that induces the tightening movement contacts the deployment mechanism 16 with the anchor element 12. The resistance ($F_R$) means that the net force ($F_N$) applied to the rotating element 14 has a component perpendicular to the tightening force ($F_T$), and so as a result the net force ($F_N$) is angled. Finally, FIG. 5C depicts the relative motion of the anchor element 12 and rotating element 14, showing how at least one of the elements 12,14 rotate. The skilled person will appreciate that the above example is non-limiting, and that the deployment mechanism 16 may be incorporated into either or both of the anchor element 12 and rotating element 14, and may utilise a different mechanism for at least partially transforming the tightening movement into a rotational movement.

The skilled person will appreciate that this is different to, and indeed directly opposing to, rotation of a threaded fastener in order to induce movement thereof (or movement in a manner akin to the first conversion mechanism as will later be described). For example, a spanner may be used to directly rotate a nut about a threaded bolt in order to induce movement therealong (i.e. rotational movement is converted into a tightening movement). This is in contrast to the present disclosure, wherein a tightening movement (including tightening movement along a threaded fastener 21 engaging threaded bore 20) is converted into rotational movement by the deployment mechanism 16. Even in embodiments wherein a threaded fastener 21 engages a threaded bore 20, the rotation of the threaded fastener 21 may only induce minimal direct rotation in the rotating element 14. In such an embodiment rotation of the threaded fastener 21 merely draws the rotating element 14 and the anchor element 12 towards one another, and it is the deployment mechanism 16 that subsequently redirects the tightening movement into rotation of the rotating element 14 about axis 18 so as to shift the fixing device 10 into a deployed configuration 10B.

In such an embodiment, as rotation of the rotating element 14 about axis 18 is not driven by friction between said rotating element 14 and a threaded fastener 21, the risk of over-rotation or under-rotation may be reduced, eliminated or at least substantially ameliorated.

In an embodiment, when the fixing device 10 is properly positioned within a structure 1, the anchor element 12 may sit within the slot 6 between the opposing flanges 8. By bearing against the flanges 8, the anchor element 12 may be prevented or inhibited from substantial rotation about axis 18. This may ensure that the rotating element 14 is preferentially rotated by the deployment mechanism 16.

Figure 6:
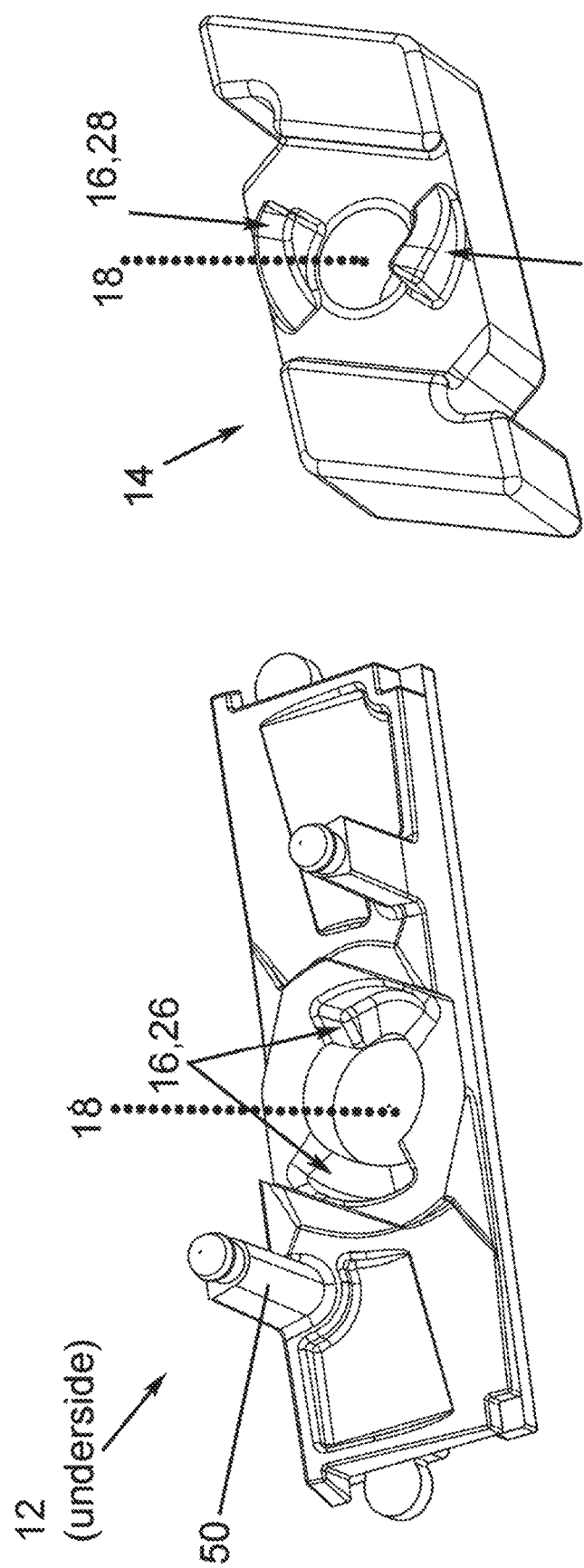

In an embodiment and with reference to FIG. 6 as well as returning reference to FIGS. 5A-5C, the deployment mechanism 16 may comprise a first portion 26 on an underside of the anchor element 12, and a second portion 28 on an upper side of the rotating element 14. When the first portion 26 and second portion 28 are in engaging contact with one another, tightening movement between the anchor element 12 and rotating element 14 is at least partially converted into rotation of the rotating element 14.

In a further embodiment, either the first portion 26 or the second portion 28 is a ramp or helical surface 27, and the other is a compatible element 29 configured to slide, roll or otherwise move relative to and along the ramp 27 (or as a follower or reciprocal helical surface). Without limiting the scope of the disclosure through theory, it is considered that conversion of the tightening movement into rotation may be achieved by orienting the ramp 27 so its surface is angled with respect to the direction of the tightening movement (i.e., the slope of the ramp 27 is neither parallel nor perpendicular to axis 18). Upon inducing the tightening movement between the locking and rotating elements 12,14, the compatible element 29 will come into engaging contact with the ramp 27. Further tightening movement will press the compatible element 29 into the ramp 27, inducing relative movement between the compatible element 29 and the ramp 27, such that one slides, rolls or otherwise moves along the other. This subsequently induces the rotating element 14 to rotate about axis 18.

The skilled person will appreciate that the above theory is described in relative terms. In an embodiment wherein the second portion 28 of the rotating element 14 is the ramp 27 (and the first portion 26 is the compatible element 29), the 'compatible element' 29 will be unable to move substantially laterally, as the anchor element 12 will impact against one or both of the opposing flanges 8 of the structure 1. Nevertheless, the compatible element 29 and ramp 27 move relative to one another.

In an embodiment, the ramp 27 is an at least partially helical cam or the oblique surface of a face cam. In a further embodiment and with reference to the embodiment depicted in FIG. 6, both the ramp 27 and compatible element 29 may be helical cams. In a further embodiment, the ramp 27 may be a female helical cam and the compatible element 29 is a male helical cam, or vice versa.

In an embodiment, movement may be sliding movement between two appropriately shaped and/or prepared surfaces. In an alternative embodiment, the compatible element 29 or the ramp 27 may comprise one or more bearings to enable rolling movement of the other therealong. Other forms of enabling movement may exist or become apparent to the skilled person and are considered to fall within the scope of the present disclosure.

Comparison to Prior Art Deployable Channel Nuts

Figure 1A:
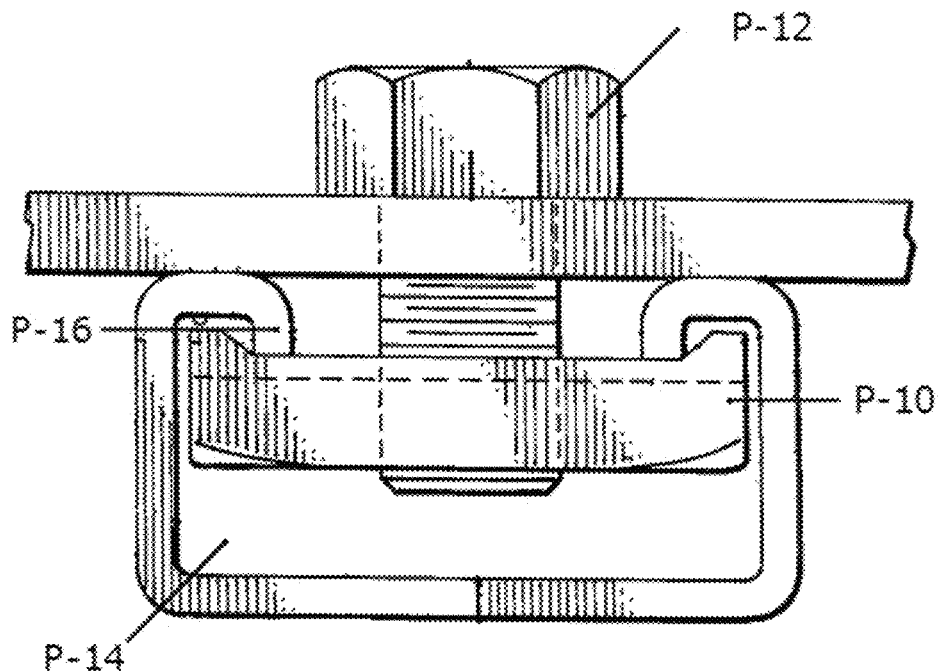
FIGS. 1A-1D are examples of prior art fixing devices.
Figure 1B:
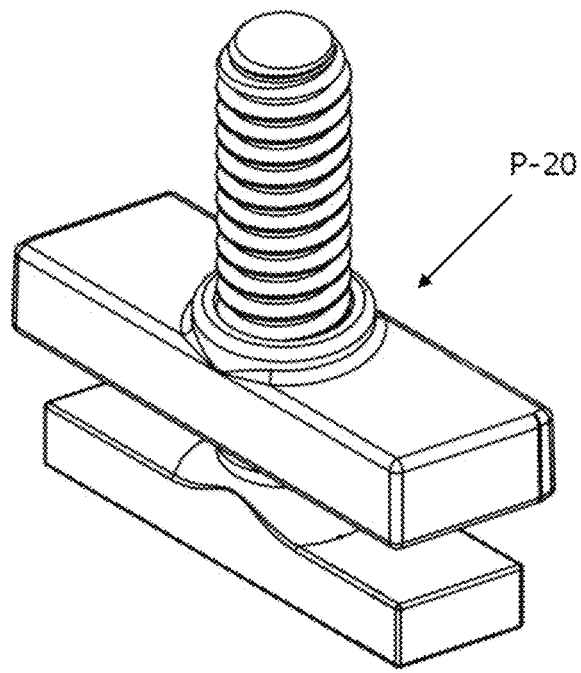
Figure 1C:
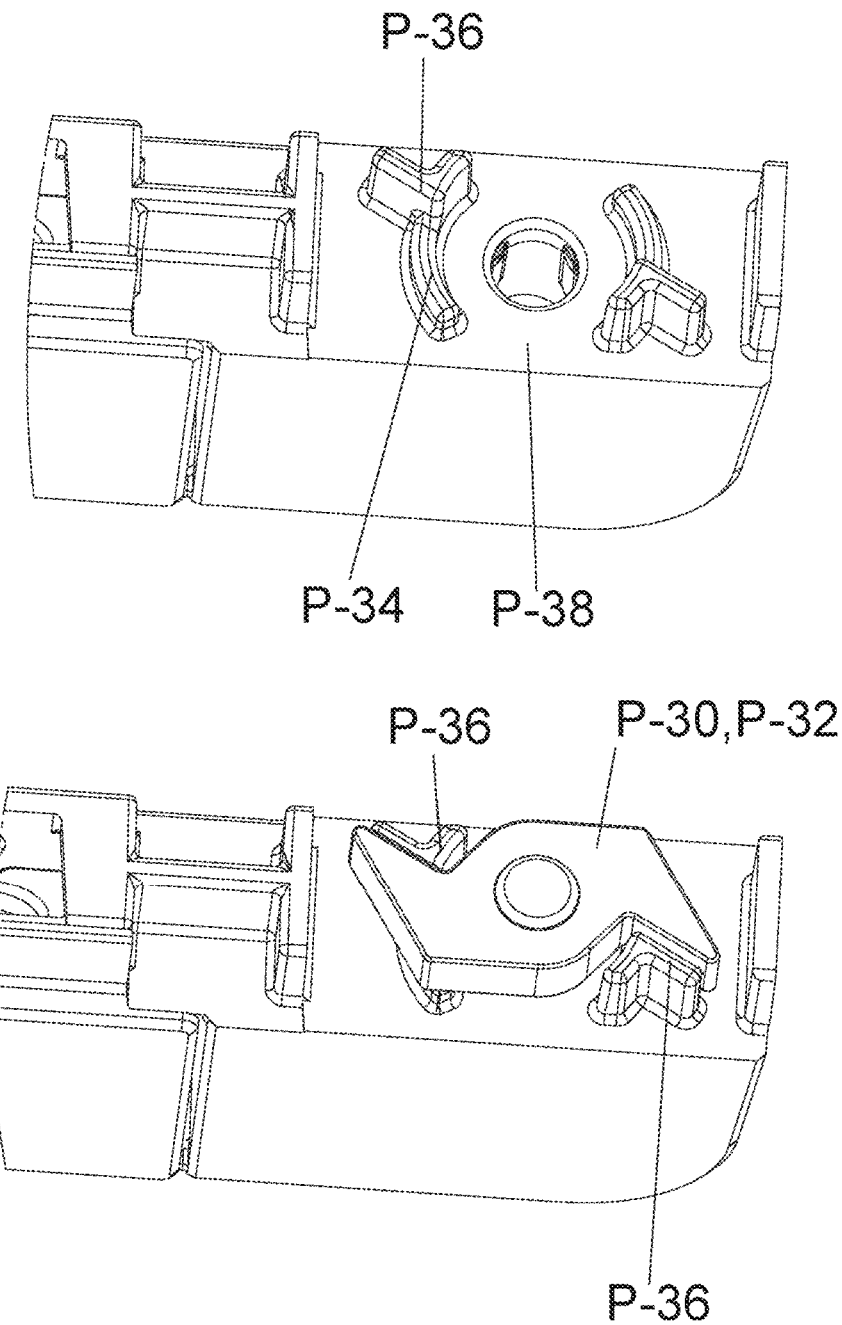

With reference to prior art FIG. 1C, it is noted that the spacer element P-34 is flat, serving solely to provide the necessary spacing and formation of the receptacle P-38. Rotation of the rotating portion P-32 is driven entirely by friction between said rotating portion and a screw element.

Figure 1D:
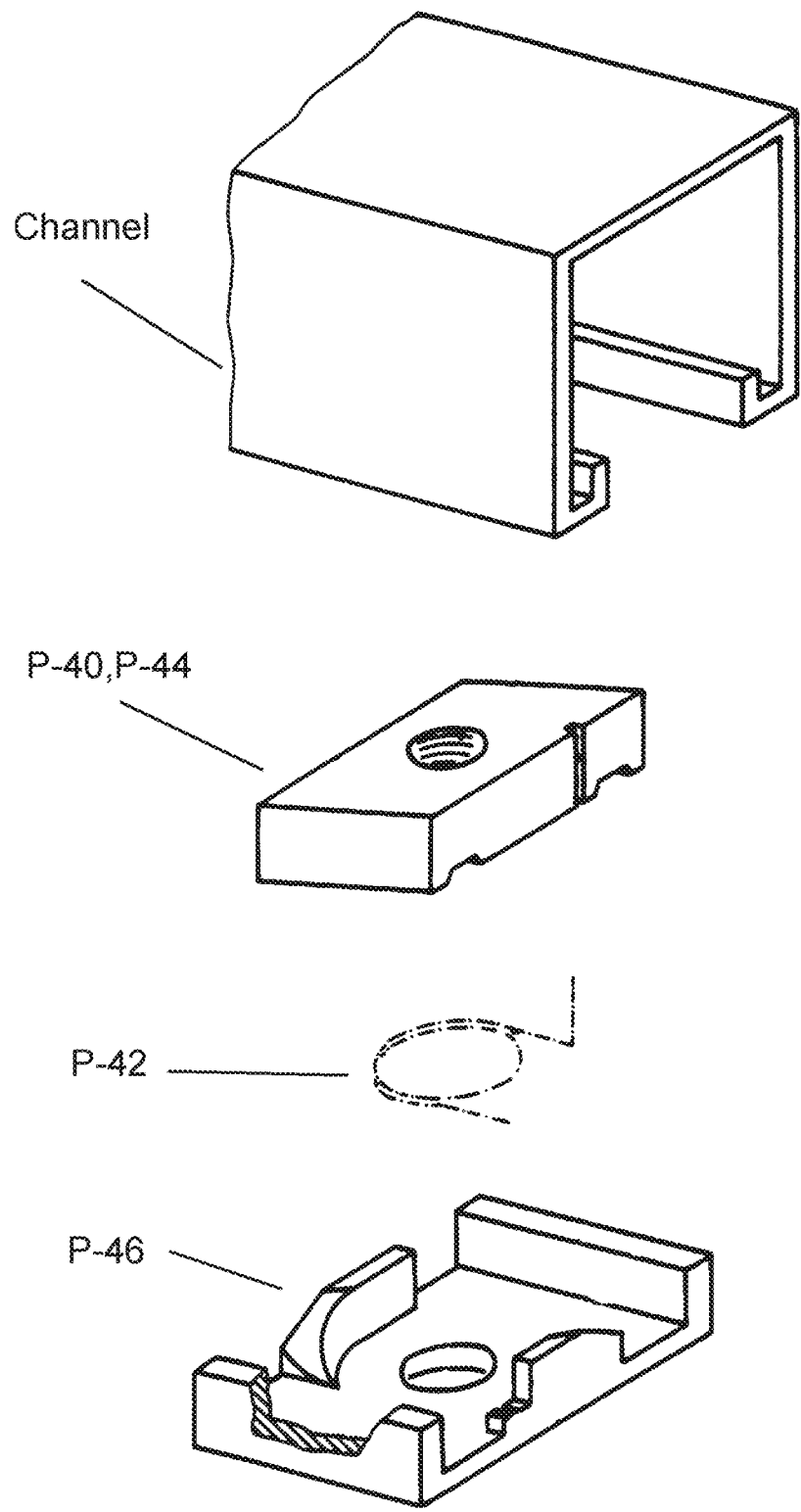

With reference to prior art FIG. 1D, it is noted that ramp structures P-48 are disclosed. However, the function of these ramp structures P-48 is an inverse to that of the deployment mechanism 16 of embodiments of the present invention. The prior art ramp structures P-48 provide a means of converting rotation of the rotating portion P-44 into a linear movement directly away from the mounting plate P-46. The subsequent rotation that fully engages the prior art rotating portion P-44 with the ridges of the depicted prior art channel is performed by the provided prior art spring element P-46.

This may be contrast against embodiments of the present invention. With reference to FIGS. 5A-5C and as previously discussed, rotation of the rotating element 14 is driven by the deployment mechanism 16 which—separately to any rotation that may be induced by an embodiment utilising a threaded fastener—converts linear movement of the rotating element 14 towards the anchor element 12 into a substantially helical movement of the rotating element 14 about the axis 18. As the person skilled in the art will appreciate, this mechanism is the direct opposite mechanism of operation of the prior art example depicted in FIG. 1D. Further, by not relying upon friction (as opposed to the prior art example in FIG. 1C) or spring mechanisms (as opposed to the prior art example in FIG. 1D), embodiments of the present invention may provide more consistent and more controlled deployment functionality with a substantially reduced chance of failure.

Rotation-Locking Mechanism

In an embodiment, when the fixing device 10 is in the deployed configuration 10B, the anchor element 12 may fixedly engage with the rotating element 14 and prevent rotation in a return direction. In an embodiment, the fixing device 10 may further comprise a locking structure 31. When the rotating element 14 is rotated to a designated angle, the locking structure 31 engages, preventing rotation of the rotating element 14 back towards width-wise alignment 10A until a user manually disengages the locking structure 31.

It is considered that provision of a rotation-locking mechanism (e.g. comprising locking structure 31) may be beneficial in that it means that a user does not necessarily need to monitor for when the rotating element 14 is sufficiently rotated and actively prevent over-rotation or under-rotation, as at least the present embodiment of the fixing device 10 will lock upon reaching an appropriate angle. This may ameliorate a major concern with 'blind' implementation of the fixing device 10, such as in a structure 1 that is on top of a vehicle roof (and thus out of direct line of sight) or otherwise occluded by an accessory 3 being mounted thereto.

As used herein, the term 'designated angle' is to simply refer to a target angle of rotation of the rotating element 14 about axis 18. In some embodiments, the 'designated angle' may differ depending upon structure 1 size, in particular the distance between internal side walls 4, as well as the length L-14 of the rotating element 14.

Figure 7:
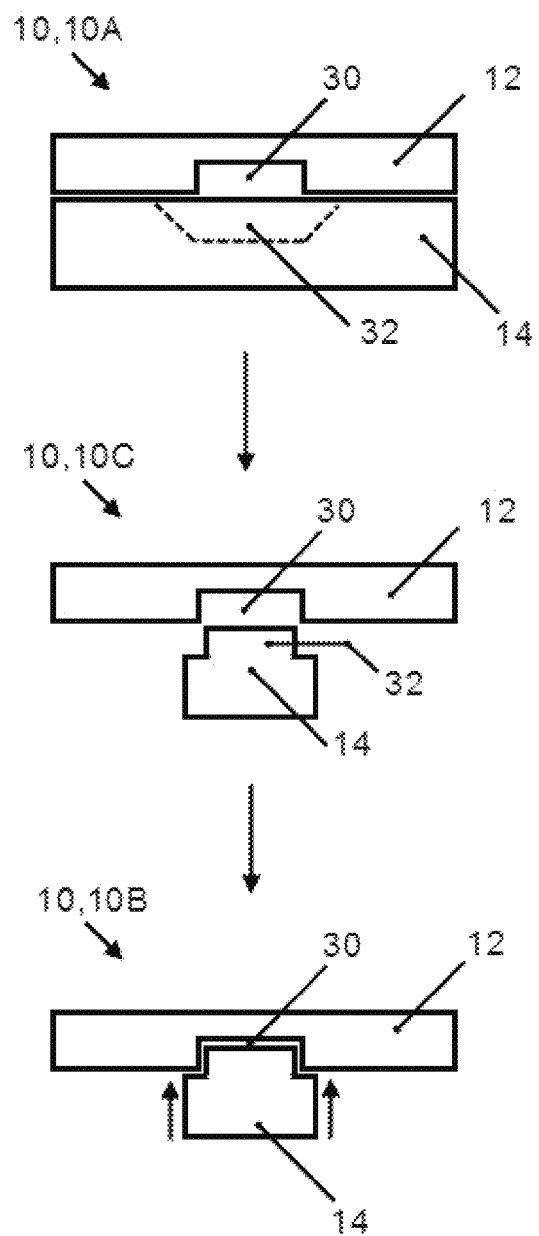
FIG. 7 depicts an embodiment of a locking mechanism of the present invention.

In an embodiment and with reference to FIG. 7, the locking structure 31 may comprise a locking recess 30 on one of the rotating element 14 and the anchor element 12, and a locking region 32 on the other. In at least the present embodiment, the locking region 32 is shaped to be received by the locking recess 30, and positioned to be at an entrance to the locking recess 30 when the rotating element 14 is rotated to the designated angle. With particular reference to FIG. 7, depicted is a sequence of the fixing device 10 shifting from an insertion configuration 10A, through an intermediate configuration 10C into a deployed configuration 10B. For the purposes of clarity, the deployment mechanism 16 is not depicted in FIG. 7.

At the intermediate configuration 10C, the rotating element 14 has undergone rotation to reach the designated angle (depicted herein as approx. 90°, but the skilled person will appreciate that this is an example only) but the locking region 32 is not yet engaged within the locking recess 30. The skilled person will appreciate that the rotating element 14 and locking region 32 depicted in the figures is exemplary only, and that these may take any number of forms without departing from the scope of the present disclosure.

In a further embodiment, at the designated angle, the deployment mechanism 16 may be disengaged or otherwise inhibited from inducing rotation in the rotating element 14. For example, in an embodiment wherein the deployment mechanism 16 comprises a first portion 26 and second portion 28, the redirecting and second portions may be moved out of engaging contact with one another, in that any contact between the two structures 26,28 is unable to induce rotation. The skilled person will appreciate that in some embodiments, following disengagement, there may still be contact between the first and second portions 26, 28 or they may otherwise be proximal to one another, but the contact is unable to induce any form of rotation in the rotating element 14. In such an arrangement, the skilled person will appreciate that although the first portion 26 and second portion 28 may be in contact with one another, they are not in engagement.

In an embodiment wherein the deployment mechanism 16 comprises a ramp 27 and compatible element 29, the ramp 27 may terminate proximal to the locking recess 30. At least a portion of the compatible element 29 may be shaped to enter the locking recess 30 and engage therewith.

As described above, the locking structure 31 prevents rotation of the rotating element 14 back towards width-wise alignment of the insertion configuration 10A until a user manually disengages the locking structure 31. In an embodiment wherein the locking structure 31 comprises a locking recess 30 and region 32, disengagement may be through inducing a loosening movement of the rotating element 14 away from the anchor element 12 along axis 18. The skilled person will appreciate that the term "loosening movement", as used herein, refers solely to the anchor element 12 and rotating element 14 moving away from one another, and that the scope of the present disclosure is not limited by which element is moving. In some embodiments, the anchor element 12 may move. In some embodiments the rotating element 14 may move. In some embodiments both the locking and rotating elements 12, 14 may move.

In an embodiment, the loosening movement may remove the locking region 32 from the locking recess 30, and may enable the deployment mechanism 16 to be engaged once more. In some embodiments this may comprising the first and second portions 26, 28 coming into contact with one another. In some alternate embodiments wherein the first and second portions 26, 28 disengage without losing contact, this may enable the contact therebetween to be modified into engaging contact.

Return to Insertion Configuration

In an embodiment wherein the fixing device 10 is not intended to provide a permanent fixing, it may be beneficial to provide for a means (or a third conversion mechanism as will later be described) of reverting the fixing device 10 back to an insertion configuration 10A. As the skilled person will appreciate, the 'insertion configuration' 10A may also enable repositioning of the fixing device 10 along a structure 1, and may also enable the fixing device 10 to be withdrawn from the structure 1 entirely.

In one embodiment, the fixing device 10 may comprise a return means that is configured to convert relative movement of the rotating element 14 away from the anchor element 12, being a loosening movement, into rotation of the rotating element 14 towards widthwise alignment, and thus returning the fixing device 10 towards the insertion configuration 10A.

In an embodiment, the loosening movement between the rotating element 14 and the anchor element 12 may be induced by a force applied by a user. This embodiment may be particularly prevalent in embodiments wherein the rotating element 14 comprises a threaded bore 20. Rotation of a threaded fastener 21 in a 'loosening' direction will subsequently drive the rotating element 14 directly away from the anchor element 12 along axis 18. In an alternate embodiment, such as an embodiment wherein rotating element 14 is a T-bolt, the loosening movement away may be induced as an accessory is loosened therefrom and the rotating element 14 becomes able to move freely.

Figure 8:
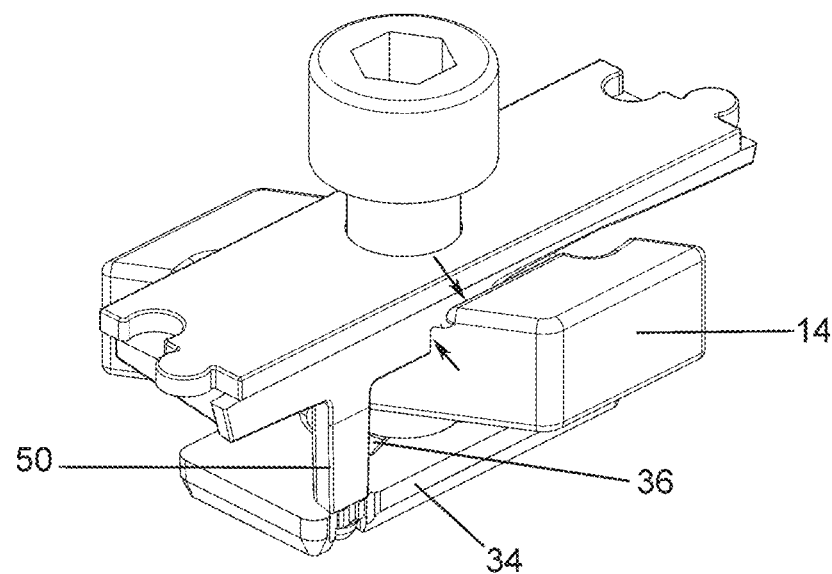
FIGS. 8-10 depict various embodiments of return mechanisms of the present invention.
Figure 9:
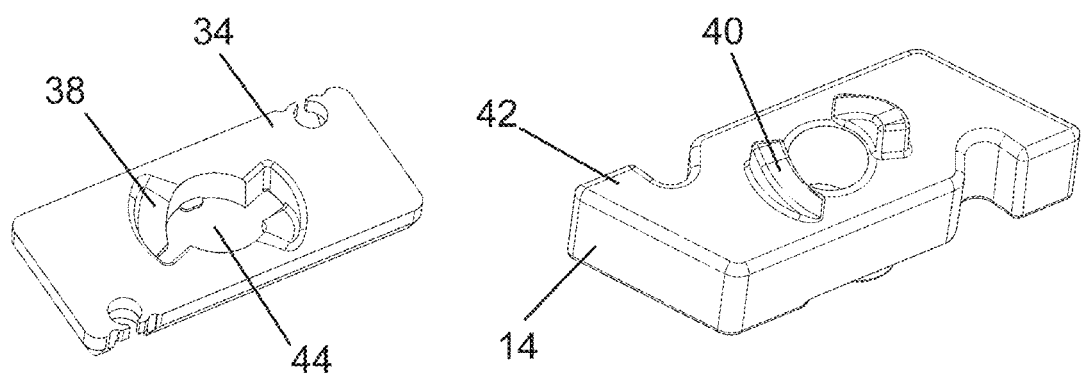

With reference to the embodiment depicted in FIG. 8, the fixing device 10 may comprise an outer element 34 that is connected to the anchor element 12, and the return means 36 is between outer element 34 and rotating element 14. In a further embodiment and with reference to FIG. 9, which depicts the outer element 34 of FIG. 8 and the underside of rotating element 14 in a separated state, the return means 36 may comprise a first return portion 38 (or third portion of the constraining element as will later be described) on the outer element 34, and a second return portion 40 (or third portion of the securing element as will later be described) on an underside 42 of the rotating element 14. When the first return portion 38 and second return portion 40 are in engaging contact with one another, relative movement of the outer element 34 and rotating element 14 towards one another (which is equivalent to the loosening movement between the anchor element 12 and rotating element 14) is at least partially converted into rotation of the rotating element 14 towards widthwise alignment with the anchor element 12 and thus towards insertion configuration 10A.

In a further embodiment, one of the first return portion 38 and the second return portion 40 is a ramp 33, and the other is a compatible element 35 configured to slide, roll or otherwise move along the ramp 33. This may have similar properties and advantages to the embodiments of first portion 26 and second portion 28 discussed previously. Upon inducing a loosening movement between the rotating element 14 and the anchor element 12, the compatible element 35 will come into engaging contact with the ramp 33. Further loosening movement will press the compatible element 35 into the ramp 33, inducing relative movement between the compatible element 35 and the ramp 33, such that one slides, rolls or otherwise moves along the other. This subsequently induces the rotating element 14 to rotate about axis 18.

As before, the skilled person will appreciate that the above theory is described in relative terms. In an embodiment wherein the second return portion 40 of the rotating element 14 is the ramp 33 (and the first return portion 38 is the compatible element 35), the 'compatible element' 35 will be unable to move substantially laterally, as the outer element 34 will be restrained by the anchor element 12 to which it is connected, which impacts against one or both opposing flanges 8. Nevertheless, the compatible element 35 will move relative to the ramp 33. In an embodiment, the ramp 33 is a helical cam. In a further embodiment, both the ramp 33 and compatible element 35 may be helical cams. In a further embodiment, the ramp 33 may be a female helical cam and the compatible element 35 is a male helical cam. In an embodiment, movement may be sliding movement between two appropriately shaped and/or prepared surfaces. In an alternative embodiment, the compatible element 35 or the ramp 33 may comprise one or more bearings to enable rolling movement of the other therealong. Other forms of enabling movement may exist or become apparent to the skilled person and are considered to fall within the scope of the present disclosure.

In a further embodiment, the outer element 34 may comprise an opening 44 to allow for entrained debris to exit from within the fixing device 10, thereby ameliorating the possible impedance of the fixing device reverting to insertion configuration 10A.

Figure 10:
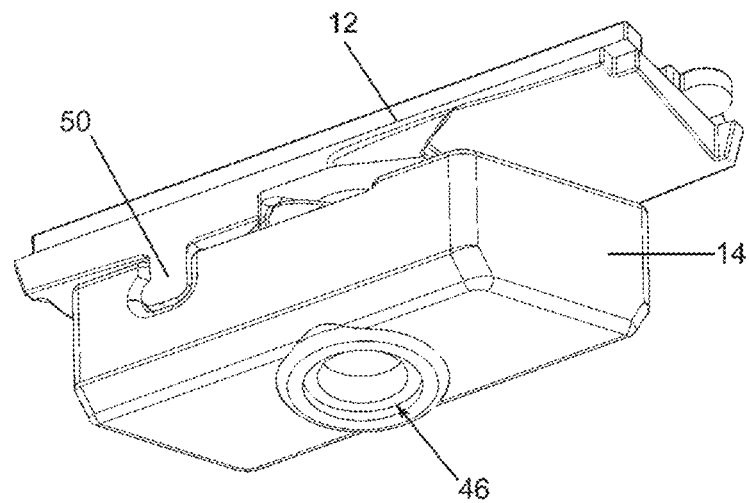

In an alternative embodiment and with reference to FIG. 10, the return means 36 may comprise a friction element 46 within the threaded bore 20 of rotating element 14. In use, the friction element 46 enables the rotating element 14 to be rotated in a reverse direction, i.e. back towards widthwise alignment 10A with the anchor element 12 through prevailing torque return. As the threaded fastener 21 is loosened, the friction element 46 is caught thereupon and drives the deployment mechanism 16 in reverse, such that the rotating element 14 and anchor element 12 relatively move away from one another and rotate towards widthwise alignment 10A.

In an embodiment wherein the deployment mechanism comprises a ramp and compatible structure, the compatible structure may be urged to move along the ramp back towards the insertion configuration 10A. As the skilled person may appreciate, in such an embodiment, the threaded fastener 21 must—prior to loosening—protrude past the friction element 46 with sufficient length to urge the compatible structure completely back along the ramp in order to ensure that the fixing device 10 is fully returned to the insertion configuration 10A.

In some embodiments, the fixing device 10 may comprise a stop 50 (or at least one stop that is operable in the releasable configuration as will later be described) configured to ensure that upon shifting from the deployed configuration 10B to the insertion configuration 10A, the rotating element 14 does not rotate beyond widthwise alignment with the anchor element 12. The stop 50 may be attached to or formed as a part of the anchor element 12, the outer element 34 (if present) or both. The stop 50 may, with reference to FIG. 7 and in embodiments wherein the fixing device 10 comprises an outer element 34, also serve as a connecting element extending between anchor element 12 and the outer element 34.

Further Embodiments

Figure 11:
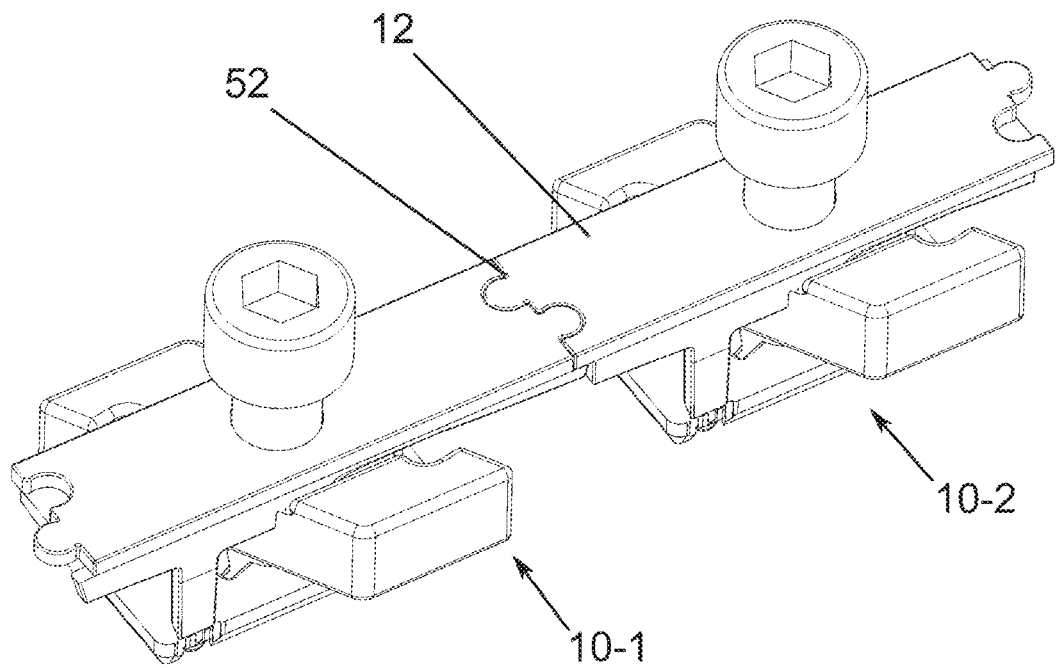
FIG. 11 depicts an embodiment of the present invention comprising an ability to connect in sequence.

In an embodiment and with reference to FIG. 11, the anchor element 12 may comprise at least one longitudinal engaging portion 52 positioned at an end thereof. The longitudinal engaging portion 52 may enable adjacent fixing devices 10-1, 10-2 to connect with one another. This embodiment may provide particular advantage when an accessory 3 requires multiple attachment points that are close together, as the adjacent fixing devices 10-1, 10-2 can 'clip' or engage one another to ensure both fixing devices 10-1, 10-2 are positioned correctly. The skilled person will appreciate that the length of the anchor element 12 may need to be varied for use with different accessories 3, each having dual attachment points with differing separation therebetween, and that such variation is within the scope of the present disclosure.

Figure 12:
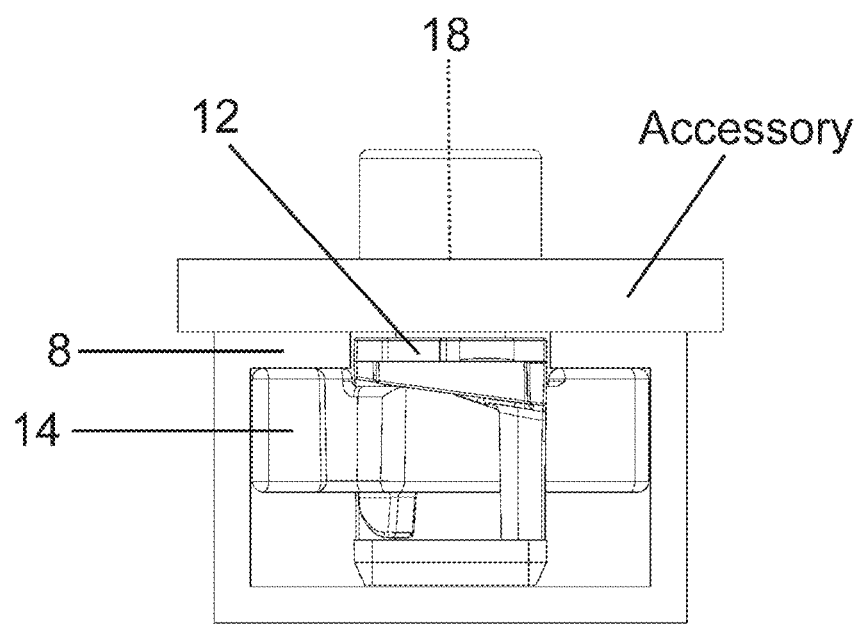
FIG. 12 depicts an embodiment of the present invention in a deployed configuration.

In an embodiment and with reference to FIG. 12, when the fixing device 10 is in the deployed configuration 10B, an upper surface of the anchor element 12 is substantially flush with an upper surface of the opposing flanges 8. In some embodiments this may enable a user to determine that the fixing device 10 is fully shifted into the deployed configuration 10B. In some embodiments, this may also enable a mounted accessory 3 to be mounted flush against the channel flanges 8.

A further aspect of the invention may comprise a method of fixing an article 3 to a slot 6 having a slot width and being formed by substantially opposing flanges 8, the slot 6 and flanges 8 having a first side and a second side, the method comprising the steps of:
1. providing a fixing device 10 comprising an anchor element 12 arranged perpendicular to an axis, a rotating element 14 mechanically connected thereto, and a deployment mechanism 16;
2. inserting the fixing device 10 in an insertion configuration 10A through the slot 6 from the first side to the second side; and
3. inducing a tightening movement between the anchor element 12 and rotating element 14 by actuating a connecting structure 21 configured to engage with the article 3 to be fixed;

such that the article 3 is fixed against the first side of the slot 6 by the tightening movement and rotation of the rotating element 14 urging the rotating element 14 against the second side of the flanges 8.

In an embodiment, the anchor element 12 and rotating element 14 may have widths less than or equal to the slot width, and the rotating element 14 has a length greater than the slot width. In an embodiment, the insertion configuration 10A comprises the anchor element 12 and rotating element 14 being arranged along the axis 18 such that their widths are aligned, such that the deployment mechanism 16 converts the tightening movement into rotation of the rotating element 14 about the axis 18.

In an embodiment, the connecting structure is a threaded fastener 21 outwardly extending from the article 3, and each of the anchor element 12 and the rotating element 14 comprise an aperture 15 extending therethrough, the apertures 15,15 aligned with the axis 18 and configured to receive the threaded fastener 21.

In an alternative embodiment, the connecting structure is a threaded fastener outwardly extending from the rotating element 14, and the anchor element 12 comprises an aperture 15 extending therethrough, the aperture 15 aligned with the axis 18, through which the threaded fastener extends.

Figure 13:
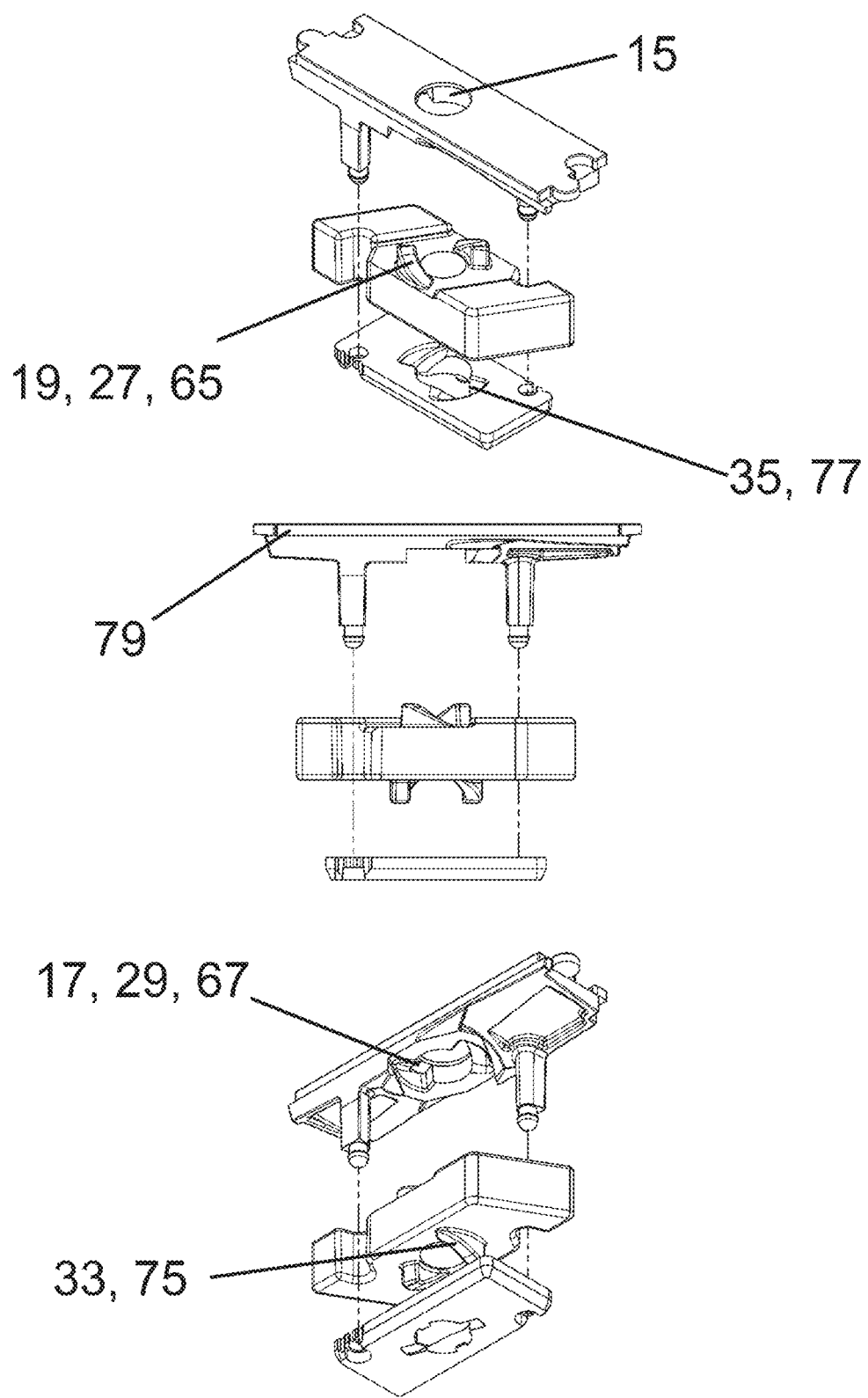
FIGS. 13-15 depict embodiments of the present invention within slots or channels.
Figure 14:
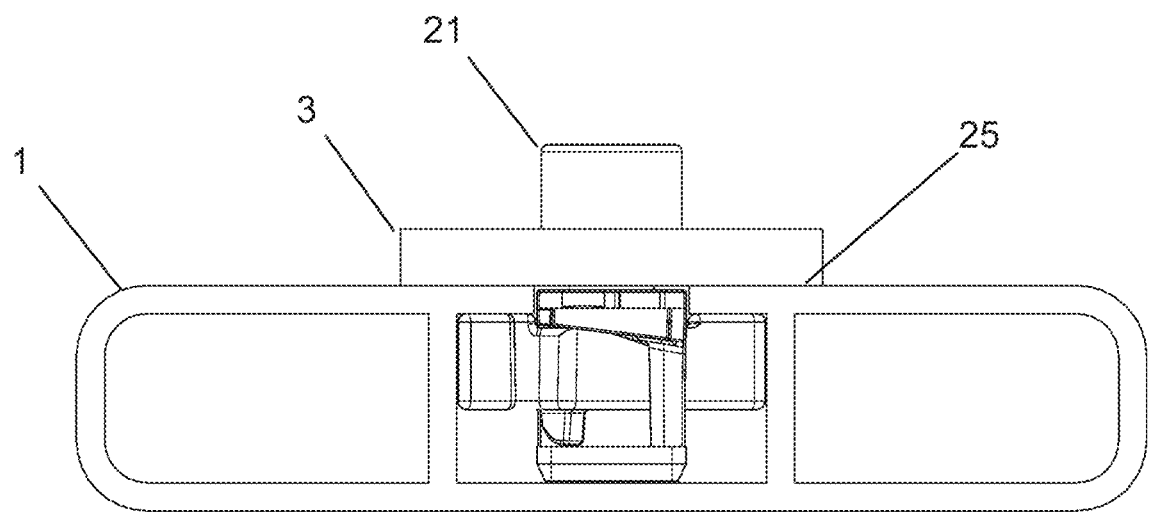
Figure 17:
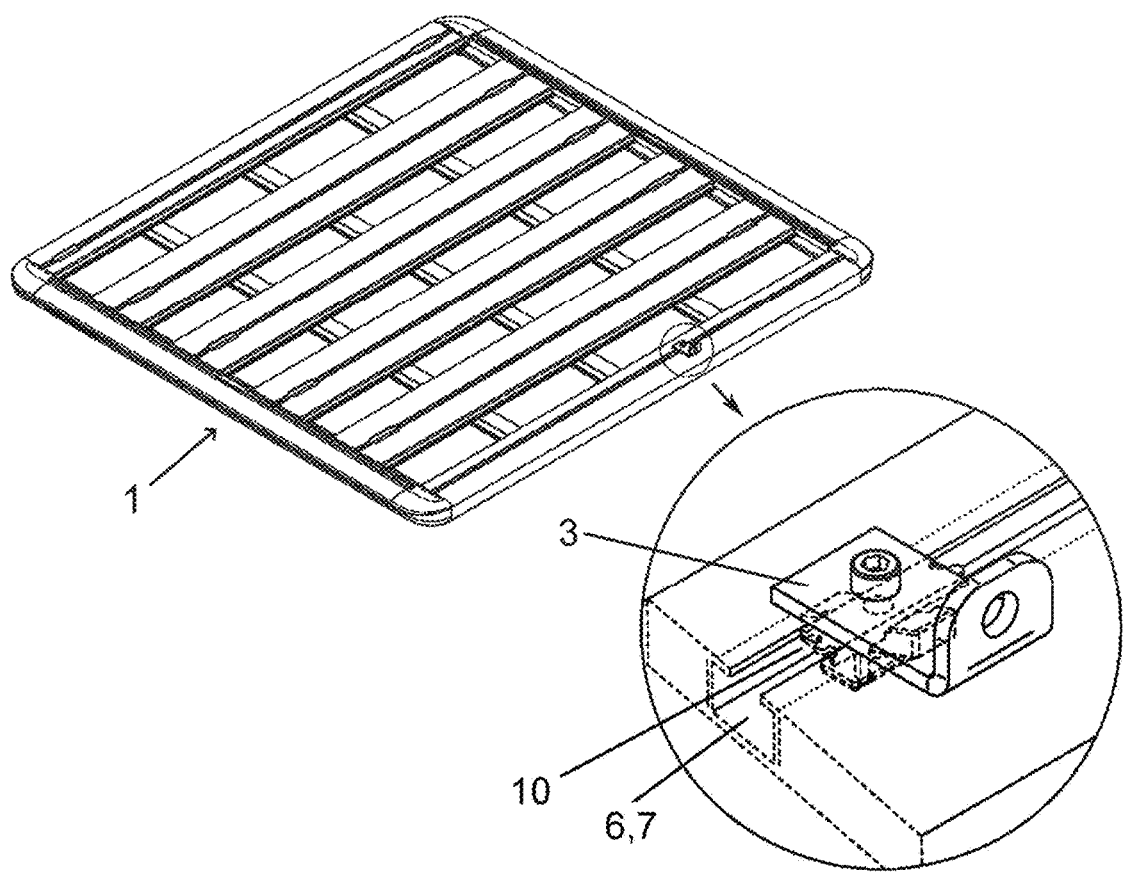

According to another embodiment of the invention (with various terminology as previously introduced), and with reference to FIGS. 13, 14, and 17, there is disclosed a system for securing an attachment 3 to a structure 1 by means of a fastening device 10. The structure 1 has a slot 6 (or a channel 7 having a slot 6) that is configured to receive the fastening device 10 therein. It will be understood that the slot 6 or channel 7 has a longitudinal opening 6 that is disposed along a longitudinal axis 23.

The longitudinal opening 6 is delineated in part by at least one portion 8 of the structure 1 that juts substantially transversely toward said longitudinal axis 23. It will be understood that the transverse direction runs orthogonal to the longitudinal axis 23 (and substantially orthogonal to the common axis 18 as will later be described). When the structure 1 is installed with the opening 6 facing upwards, the transverse direction is horizontal. In this context 'substantially transverse' will be understood as a functional reference to the at least one jutting portion 8 being capable of interposition between the securing element 14 and the attachment 3 (which can undergo a relative lineal motion toward one another along the common axis 18 as will later be described). Preferably the at least one jutting portion 8 subtends an angle to the transverse direction of less than 45 degrees. More preferably the subtended angle is less than 5 degrees.

Preferably, the longitudinal opening 6 is delineated on either side by two of the at least one jutting portions 8. More preferably, the two jutting portions 8 consist of two flanges 8 that run substantially parallel to the longitudinal axis 23. Most preferably, the slot 6 or channel 7 is a channel and the two flanges 8 jut directly toward one another with the longitudinal axis 23 disposed therebetween.

Figure 4:
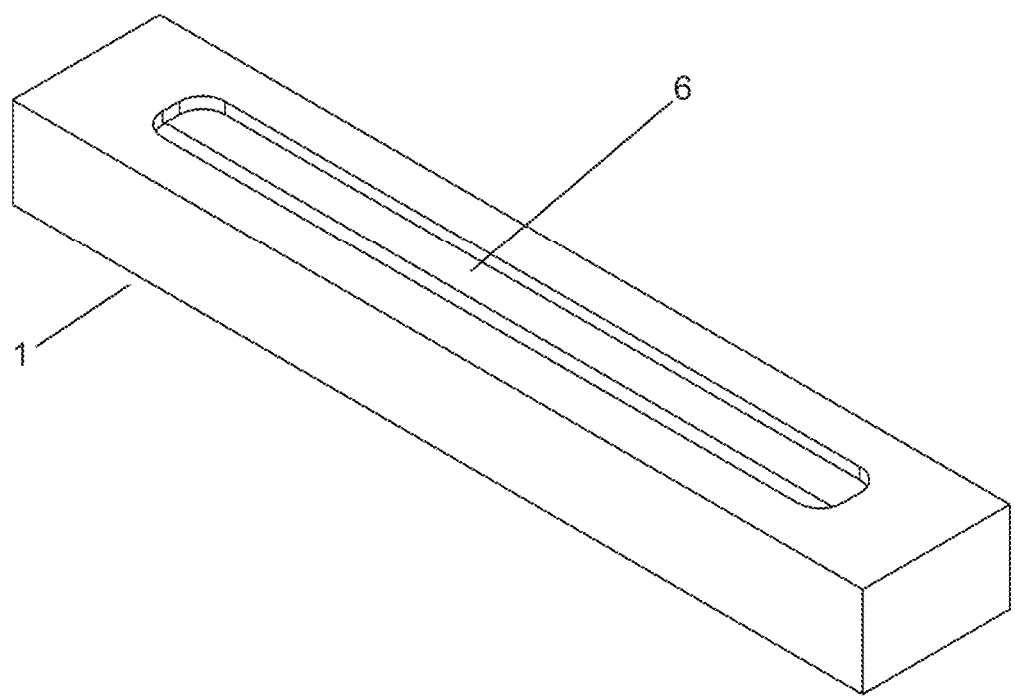
FIG. 4 depicts an example of a slot having a fixed length.

With reference to FIG. 4, it will be appreciated according to one use of the terminology that a slot 6 or a channel 7 and the corresponding opening 6 can be of definite length, but is not limited to only being interpreted as such. Rather, the term slot 6 or channel 7 can also be of indefinite length. As such the fastening device 10 can be used with two different forms of structure 1.

The fastening device 10 consists of a securing element 14 and a constraining element 12. These two elements 12,14 are interoperable for securing the attachment 3 to the structure 1.

The securing element 14 has a surface 24 and the attachment 3 has an opposable surface 25, each being faceable toward the at least one jutting portion 8 for stressing the at least one jutting portion 8 when interposed therebetween. Preferably, the stressing between the surface 24 of the securing element 14 and the surface 25 of the attachment 3 is a compression. In an alternative embodiment the system can be configured whereby the stressing involves a shear stress.

The system includes two conversion mechanisms that are each adapted to convert rotational motion and lineal motion along a substantially common axis 18 that is substantially orthogonal to the longitudinal axis 23 when the fastening device 10 is received in the slot 6 or channel 7.

In this context a 'substantially' common axis 18 will be understood as a functional reference to the potential for the two conversion mechanisms to be offset from one another but nevertheless capable of interoperability whereby a conversion in one of the conversion mechanisms can induce a conversion in the other (as will later be described). Also, 'substantial orthogonality' will be understood as a functional reference to the securing element 14 being capable of translation along the common axis 18 toward the attachment 3 with the at least one jutting portion 8 interposed therebetween. This is connected to the meaning of 'substantially transverse' in that the at least one jutting portion 8 subtends a non-zero and preferably normal angle to the common axis 18. Preferably the orthogonality falls within 30 degrees of normal. More preferably the orthogonality falls within 5 degrees of normal. Most preferably the orthogonality does not deviate from normal by more than the variation inherent to the tolerances of the component parts such as any threaded interconnections (that is, an engineered intent for the orthogonality to fall within 0 degrees of normal when the component parts are disposed at the centre of their respective tolerances).

Figure 16:
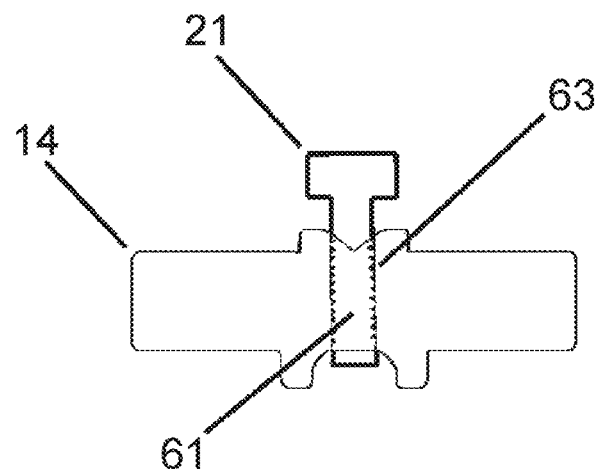
FIG. 16 depicts a conversion mechanism of the present invention.

With reference to FIG. 16, a first of said conversion mechanisms 61,63 consists of a first portion 61 of the attachment 3 that interengages with and is handedly rotatable relative to a first portion 63 of the securing element 14 about the common axis 18. A second of said conversion mechanisms 65, 67 consists of a second portion 65 of the securing element 14 that interengages with and is handedly rotatable relative to a first portion 67 of the constraining element 12 about the common axis 18.

Preferably the first conversion mechanism 61,63 consists of a mateable pair of threads 61,63. More preferably the first portion 61 of the attachment 3 is externally screw threaded and the first portion 63 of the securing element 14 is internally threaded to be mateable therewith. Most preferably the attachment 3 includes a threaded bolt 21, and the surface 25 of the attachment 3 underlies the head of the bolt.

In an alternative embodiment the first portion 61 of the attachment 3 is internally threaded and the first portion 63 of the securing element 14 is externally screw threaded to be mateable therewith. In such an arrangement the attachment 3 preferably includes a threaded nut, and the surface 25 of the attachment 3 consists of a face of the nut.

It will be understood that the attachment 3 can consist of multiple component parts. For example, the attachment 3 can consist of a tray and the preferred bolt 21. The preferred bolt 21 can be installed through an aperture in the tray to secure the tray to the channel 7 of a structure 1 (being a roof rack). Said differently, another component of the attachment 3 can abut the at least one jutting portion 8, and can be compressed alongside the at least one jutting portion 8 between the surface 24 of the securing element 14 and the surface 25 of the attachment 3 when the attachment 3 is secured to the structure 1. It will also be understood that the attachment 3 can be integrally formed, with the first portion 61 of the attachment 3 being connected in physical continuum with the surface 25 of the attachment 3.

Preferably the first conversion mechanism 61,63 has a first lead, the second conversion mechanism 65, 67 has a second lead, and the first lead is less than the second lead. More preferably the first lead is between 5 to 25 times smaller in dimension than the second lead, and even more preferably between 10 to 20 times smaller in dimension than the second lead. The difference in leads enables the relative rotations of the first 61,63 and second 65, 67 conversion mechanisms to occur at different rates so as to be suitable for their respective (and cooperative) tightening motions.

Preferably the second conversion mechanism 65, 67 consists of a face cam. More preferably, the second portion 65 of the securing element 14 consists of a helical surface 27 and the first portion 67 of the constraining element 12 consists of a follower or a reciprocal helical surface 29.

Preferably the first conversion mechanism 61,63 has a first handedness and the second conversion mechanism 65, 67 has an opposing second handedness. More preferably, the first conversion mechanism 61,63 is right handed and the second conversion mechanism 65, 67 is left handed whereby the fastening device 10 can be tightened in a right handed manner in accordance with convention.

The second portion 79 of the constraining element 12 is engageable with the slot 6 or channel 7 whereby a rotation of the constraining element 12 about the common axis 18 and relative to the slot 6 or channel 7 is substantially constrained when the fastening device 10 is received therein. It will be appreciated that the constraining element 12 can be readily configured with this property by having one dimension longer than another so as to enable an interference between the constraining element 12 and the slot 6 or channel 7.

The securing element 14 has a first and second diameters each being substantially orthogonal to the common axis 18, the first diameter being greater than the second diameter. Preferably the securing element 14 is bar-shaped. It will be appreciated that this enables the securing element 14 to both be insertable into the slot 6 or channel 7 and to be engageable therewith, and 'substantial orthogonality' will be understood in this regard (later to be described in terms of transverse dimensions).

In one preferable embodiment, the slot 6 or channel 7 is a channel, the at least one jutting portion 8 consists of at least one flange 8 that runs substantially parallel to the longitudinal axis 23, and the longitudinal opening 6 to the channel 7 has a first transverse dimension that is less than a second transverse dimension of an interior 2 of the channel 7, and wherein the first transverse dimension is less than the first diameter of the securing element and greater than the second diameter of the securing element. Preferably the at least one flange 8 consists of two such flanges 8 disposed on opposing sides of the channel 7 with the first transverse dimension extending therebetween.

The fastening device 10 and the slot 6 or channel 7 are configured such that the fastening device 10 is reversibly transformable between an obstructible configuration or state 10B, wherein the fastening device 10 is obstructed from being removed from the slot 6 or channel 7 by an interference between the securing element 14 and the at least one jutting portion 8, and a releasable configuration or state 10A, wherein the fastening device 10 can be removed from the slot 6 or channel 7, when the fastening device 10 is received in the slot 6 or channel 7.

Preferably the securing element 14 in the obstructible configuration 10B is oriented about the common axis 18 with the first diameter of the securing element 14 having a transverse component that is greater than the first transverse dimension and less than the second transverse dimension, and wherein the securing element 14 in the releasable configuration 10A is oriented about the common axis 18 with both the first and second diameters of the securing element 14 each having corresponding transverse components that are less than the first transverse dimension.

The first 61,63 and second 65,67 conversion mechanisms cooperate to enable transformation from the releasable configuration 10A to the obstructible configuration 10B. Preferably, the first 61,63 and second 65,67 conversion mechanisms cooperate to enable transformation from the releasable configuration 10A to the obstructible configuration 10B when the constraining element 12 is at least partly constrained against translation along the common axis 18 relative to the surface 25 of the attachment 3 (for example by a resiliently biased element such as a spring being disposed therebetween). More preferably, the constraining element 12 is completely so constrained during the transformation (for example by abutment against the attachment 3).

Figure 15:
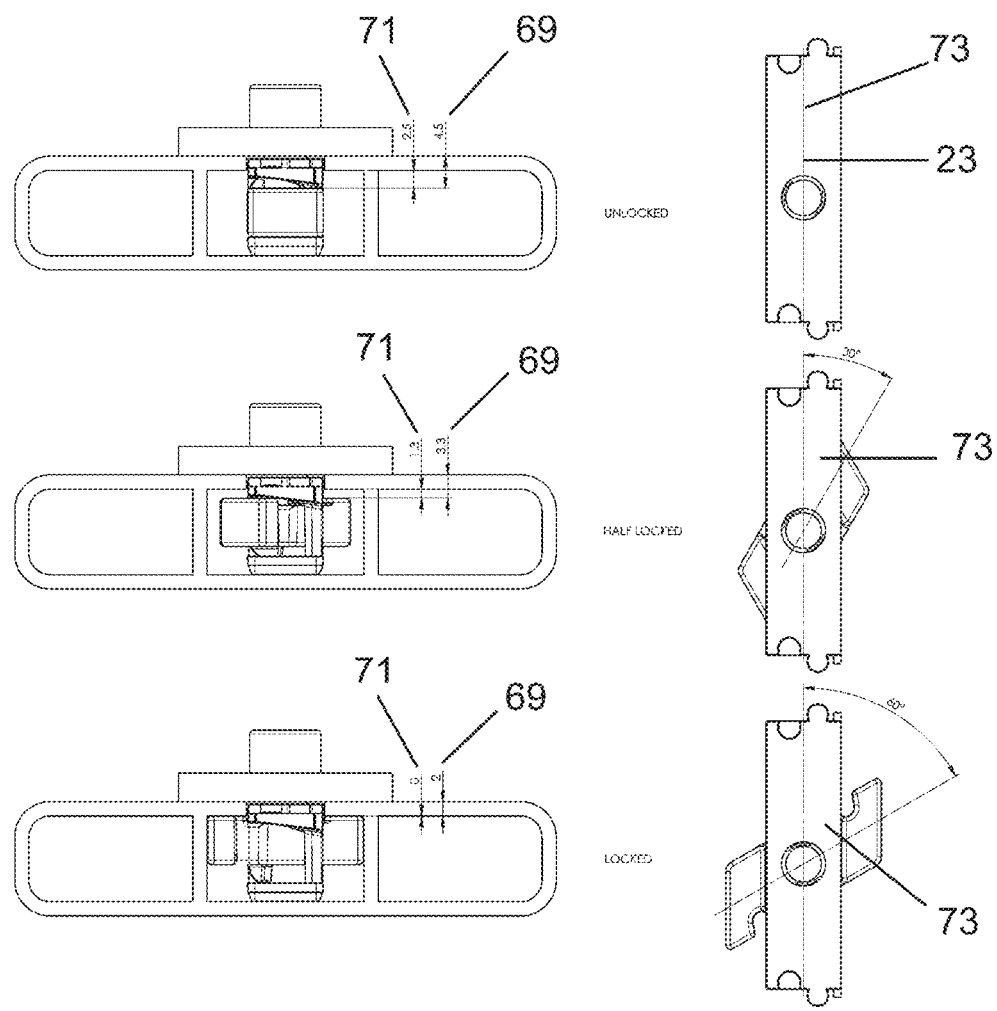

The interrelationship between the first 61,63 and second 65,67 conversion mechanisms can be particularly defined with reference to distances or dimensions, and with reference to angles of rotation, involved in the transformation between the obstructible configuration 10B and the releasable configuration 10A as exemplified in FIG. 15. For this purpose, there is defined a first distance 69 between the surface 25 of the attachment 3 and the surface 24 of the securing element 14 when the attachment 3 is interengaged therewith, said first distance 69 being parallel to the common axis 18. There is also defined a second distance 71 between the surface 24 of the securing element 14 and the constraining element 12 when the securing element 14 is interengaged therewith, said second distance 71 being parallel to the common axis 18. Finally there is defined an angle 73 that is formed between the first diameter and the longitudinal axis 23 when the fastening device 10 is received in the slot 6 or channel 7, said angle 73 residing in a plane that is orthogonal to the common axis 18.

The first conversion mechanism 61,63 can undergo a relative rotation in a first handed direction causing a first relative lineal motion and a corresponding reduction in the first distance 69, which occasions a second relative lineal motion in the second conversion mechanism 65, 67 and a corresponding change in the second distance 71, thereby inducing the second conversion mechanism 65, 67 to undergo a relative rotation in a second handed direction whereby the angle 73 increases from the releasable configuration 10A to the obstructible configuration 10B. Preferably the change in the second distance 71 is a reduction.

It will be understood that the first and second lineal motions are relative to the first distance 69 and the second distance 71 respectively, as it is necessary to have a frame of reference when defining motion. Similarly the rotations in the first and second handed directions are relative to the longitudinal axis 23 of the slot 6 or channel 7. Preferably the first handed direction and the second handed direction are opposing directions. In an alternative embodiment the first and second handed directions are the same direction.

According there is provided a system whereby the first conversion mechanism 61,63 is operable in the obstructible configuration 10B such that the at least one jutting portion 8 can be stressed between the surface 24 of the securing element 14 and the surface 25 of the attachment 3 whereby the attachment 3 is secured to the structure 1.

The angle 73 so formed between the first diameter and the longitudinal axis 23 can also be used to describe the relationship between structure and function in certain features of the constraining element 12. In particular the constraining element 12 is preferably provided with at least one stop 50 that is operable in the obstructible configuration 10B to constrain the second conversion mechanism 65, 67 from undergoing a relative rotation in the second handed direction beyond a first predetermined value of the angle 73 of between 0 and 90 degrees, and more preferably between 45 and 75 degrees. The constraining element 12 is also preferably provided with at least one stop 51 that is operable in the releasable configuration 10A to constrain the second conversion mechanism 65, 67 from undergoing a relative rotation in a direction opposing the second handed direction below a second predetermined value of the angle 73 of 0 degrees.

The system further includes a third of said conversion mechanisms 36 consisting of a third portion 75 of the securing element 14 that interengages with and is handedly rotatable relative to a third portion 77 of the constraining element 12 about the common axis 18, the second 65,67 and third 36 conversion mechanisms being located on opposing sides of the securing element 14, and the third conversion mechanism 36 being operable to enable a transformation from the obstructible configuration 10B to the releasable configuration 10A when the third portion 75 of the securing element 14 is urged against the third portion 77 of the constraining element 12.

Preferably the third conversion mechanism 36 consists of a face cam. Preferably the third conversion mechanism 36 has the same handedness as the second conversion mechanism.

Said differently and in short, there is provided a system for securing an attachment to a structure by means of a fastening device: said structure having a slot or channel that is configured to receive the fastening device therein; said slot or channel having a longitudinal opening that is disposed along a longitudinal axis, said opening being at least partly delineated by at least one portion of said structure that juts substantially transversely toward said longitudinal axis; said fastening device consisting of a securing element and a constraining element; and said securing element having a surface and said attachment having an opposable surface, each being faceable toward the at least one jutting portion for stressing the at least one jutting portion therebetween; said system including two conversion mechanisms that are each adapted to convert rotational motion and lineal motion along a substantially common axis that is substantially orthogonal to the longitudinal axis when the fastening device is received in the slot or channel: a first of said conversion mechanisms consisting of a first portion of the attachment that interengages with and is handedly rotatable relative to a first portion of the securing element about the common axis; and a second of said conversion mechanisms consisting of a second portion of the securing element that interengages with and is handedly rotatable relative to a first portion of the constraining element about the common axis; a second portion of the constraining element being engageable with the slot or channel whereby a rotation of the constraining element about the common axis and relative to the slot or channel is substantially constrained when the fastening device is received therein; the securing element having a first and second diameters each being substantially orthogonal to the common axis, the first diameter being greater than the second diameter; the fastening device and the slot or channel being configured such that the fastening device is reversibly transformable between an obstructible configuration, wherein the fastening device is obstructed from being removed from the slot or channel by an interference between the securing element and the at least one jutting portion, and a releasable configuration, wherein the fastening device can be removed from the slot or channel, when the fastening device is received in the slot or channel; the first and second conversion mechanisms cooperating to enable transformation from the releasable configuration to the obstructible configuration: there being a first distance between the surface of the attachment and the surface of the securing element when the attachment is interengaged therewith, said first distance being parallel to the common axis; there being a second distance between the surface of the securing element and the constraining element when the securing element is interengaged therewith, said second distance being parallel to the common axis; there being an angle formed between the first diameter and the longitudinal axis when the fastening device is received in the slot or channel, said angle residing in a plane that is orthogonal to the common axis; and wherein the first conversion mechanism can undergo a relative rotation in a first handed direction causing a first relative lineal motion and a corresponding reduction in the first distance, which occasions a second relative lineal motion in the second conversion mechanism and a corresponding change in the second distance, thereby inducing the second conversion mechanism to undergo a relative rotation in a second handed direction whereby the angle increases from the releasable configuration to the obstructible configuration; and wherein the first conversion mechanism is operable in the obstructible configuration such that the at least one jutting portion can be stressed between the surface of the securing element and the surface of the attachment whereby the attachment is secured to the structure.

Accordingly there is provided a securing system that can be usefully adapted for a variety of attachments 3 and a variety of structural configurations including without limitation, roof racks, the interior of vehicles, trays of utility vehicles, and so on.

It will be appreciated that the another embodiment can describe the same device as in previous embodiments albeit in different terms. Accordingly the structural and functional features associated with a given term of the another embodiment, can have the same association with the corresponding term in the previously described embodiments and vice versa.

In an alternative embodiment, the system includes at least one such conversion mechanism (being the second 65,67 of said conversion mechanisms). In lieu of the first 61,63 of said conversion mechanisms, the system is provided with a tensioning mechanism that is adapted to provide the first relative lineal motion and the corresponding reduction in the first distance 69 without necessarily providing a relative rotation. The tensioning mechanism can consist of a gas cylinder or a pre-tensioned spring.

Application of the Invention

FIG. 17 depicts an example wherein the structure 1 is a roof rack of a vehicle, the roof rack comprising slots 6 of indefinite length. A user may be able to affix articles 3 at multiple points along the slot 6, and may be able to rapidly and easily reconfigure said one or more articles 3. In particular, due to the ability of the fixing or fastening device 10 being able to be directly inserted into and removed from the slot 6 or channel 7, an article may be affixed or removed from the structure 1 without requiring removal of any adjacent articles. However, the skilled person will appreciate that the present invention is not limited solely to the aforementioned use. One or more embodiments of the fixing device 10 are able to be employed in various applications, with the only requirement being that the structure comprises a longitudinally-extending slot that is suitably adapted to receive the fixing device. To illustrate the adaptability of the fixing device, some non-limiting examples of applications of at least one embodiment of the present invention are laid out below.

Figure 18:
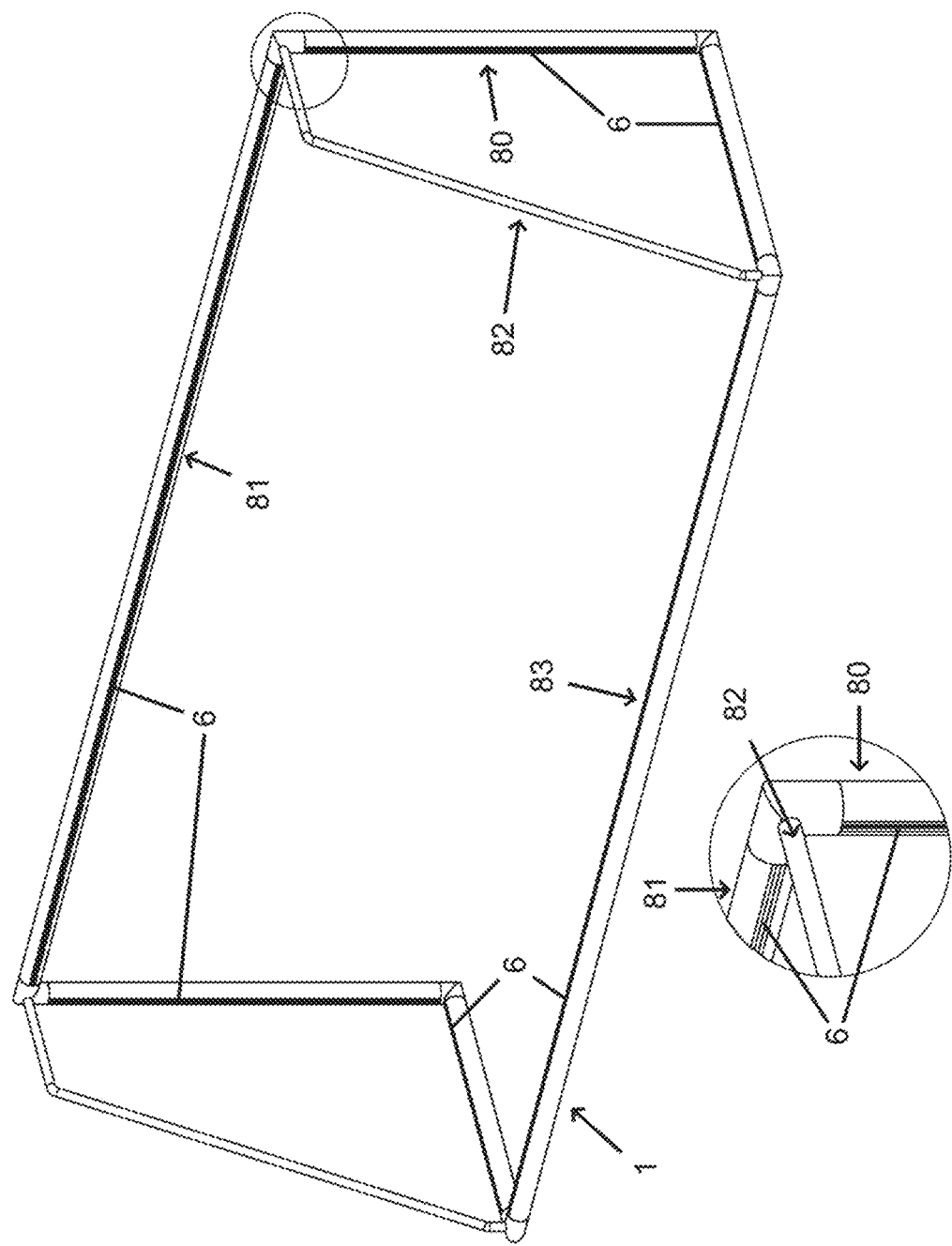
Figure 19:
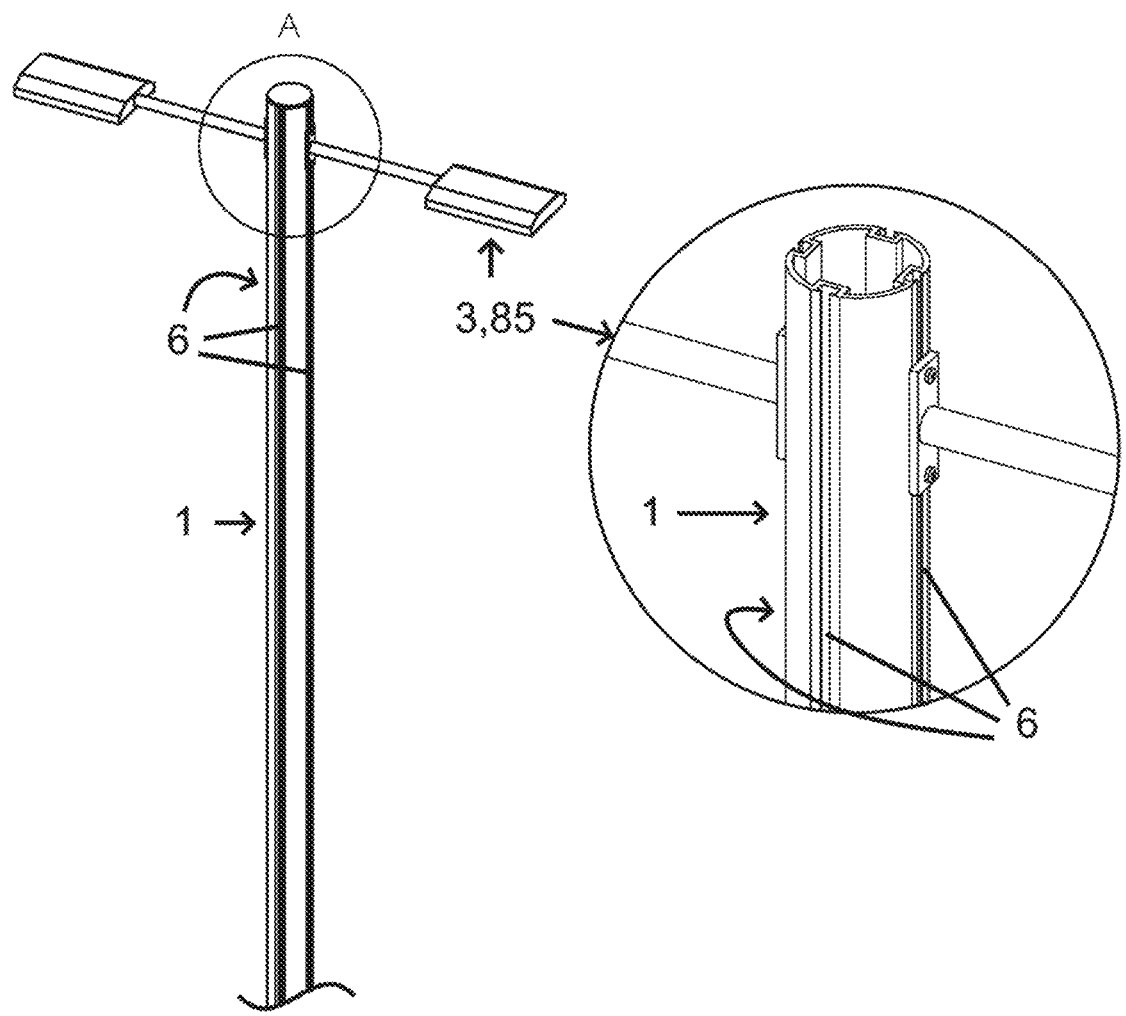

Depicted in FIG. 18 and the associated inset is a first non-limiting example of an application of the present invention, wherein the structure 1 is a piece of fixed (or relatively fixed) sports equipment that nets or other fragile, frayable or otherwise soft, flexible or light components are affixed to. The particular depiction in FIG. 19 is a football goal frame comprising one or more slots 6 extending for at least a portion of a length of some or all of the posts 80, crossbar 81, back 82 or base 83, such that a net (not shown) may be affixed to the goal frame using one or more fixing devices 10 of an embodiment of the present invention. The skilled person will appreciate that, as components such as nets tend to be more prone to damage from use and weather than the goal frames, it is beneficial to provide a user with the ability to quickly and easily affix and remove the net from the goal frame, and may enable or promote rapid deployment of the net when the football field is in use and subsequent packing and storage when the field is not in use. Other ball sports may also fall within the scope of the present non-limiting example—for instance, sports such as hockey (both field and ice), basketball, netball, tennis and volleyball all make use of nets during training and games, and being able to rapidly and easily deploy or retrieve these nets would be advantageous. Cricket and baseball (and variants thereof) often use nets in bowling and/or batting practice—as does golf in driving and chipping practice—and it may be desirable for these nets to be able to be packed away when not in use.

Depicted in FIG. 19 and the associated inset is a second non-limiting example of an application of the present invention, wherein the structure 1 is a street pole and an article 3 is to be mounted thereto. One or more slots 6 extend for at least a portion of the length of the street pole, such that the article 3 may be affixed at a particular height. The article 3 may comprise streetlight fixtures 85 (as is depicted in FIG. 20), street signs, roadwork signs, temporary signs or lights, and so on. In one particular non-limiting example, the article may comprise decorations or banners (or the mounting means therefor), enabling a particular city or suburb council maintenance crew to quickly and easily mount and dismount temporary or seasonal banners (e.g., in commemoration of an upcoming holiday), decorations (e.g., Christmas decorations) or other signs (e.g., advertising for events).

Depicted in FIG. 20 and the associated inset is a third non-limiting example of an application of the present invention, wherein the structure 1 is an example profile frame constructed of a number of profile lengths 88 connected together. Each profile length 88 comprises channels 7 having slots 6 extending along their length. Profile lengths 88 are able to be attached to one another in myriad arrangements and have an article (not depicted) such as equipment mounted thereto, and the slot 6 and associated structure 1 enable an affixed profile length 88 or article (not depicted) to be positioned at any location along the length of the receiving profile length. As the skilled person will appreciate, the ability of the fixing device 10 of the present invention to be inserted directly into the slot 6 enables the user to 'cap' the ends of the profile lengths, covering potentially sharp and hazardous edges. It also enables an assembled machine (comprising, e.g., multiple components mounted to the profile frame) to be rapidly adjusted or reconfigured, or have components added to or removed from the assembled machine without needing to completely disassemble it.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. A fixing device comprising:
   An anchor element that is positioned along an axis, the anchor element extending substantially perpendicular thereto;
   a rotating element arranged perpendicular to and rotatable about the axis, and spaced therealong from the anchor element; and
   a deployment mechanism, comprising a first deployment portion on the anchor element and a second deployment portion on the rotating element;
   wherein one of the first and second deployment portions comprise a sloping surface extending at least partway around the axis, and the other is shaped to be able to roll, slide or otherwise move along the sloping surface;
   the anchor element and rotating element are able to move towards one another along the axis; and
   the deployment mechanism is adapted to convert movement of the anchor element and rotating element towards one another into helical movement in a first-handed direction along and about the axis.

2. The fixing device of claim 1, further comprising a locking mechanism adapted to selectively fix and retain the anchor element and rotating element at a predetermined angle relative to one another about the axis.

3. The fixing device of claim 2, wherein the locking mechanism comprises:
   a first locking portion positioned on the anchor element; and
   a second locking portion positioned on the rotating element;
   wherein the first and second locking portions are arranged to align with one another when the anchor element and rotating element are at the predetermined angle relative to one another about the axis.

4. The fixing device of claim 3, wherein one of the first and second locking portions comprises a locking recess; and
   the other comprises a locking region shaped to be received within the locking recess.

5. The fixing device of claim 1, wherein each of the anchor element and the rotating element comprise an aperture extending therethrough, the apertures aligned with the axis and configured to receive a connecting structure therethrough.

6. The fixing device of claim 5, wherein:
   the anchor element has a first and second longitudinal end, with an anchor element length extending therebetween;
   the first and second longitudinal ends are each adapted to receive and interface with both the first and second longitudinal ends of an anchor element of a substantially similar adjacent fixing device; and
   the aperture extending through the anchor elements of the fixing device and the adjacent fixing device is off-centre, such that the apertures selectively form:
   a. a first aperture pair, having a first spacing, when the first longitudinal ends of the anchor elements of the fixing device and the adjacent fixing device receive and interface with one another;
   b. a second aperture pair, having a second spacing, when the first and second longitudinal end of the respective anchor elements of the fixing device and the adjacent fixing device receive and interface with one another; and
   c. a third aperture pair, having a third spacing, when the second longitudinal ends of the anchor elements of the fixing device and the adjacent fixing device receive and interface with one another.

7. The fixing device of claim 1, wherein one of the anchor element and the rotating element comprises an aperture extending therethrough that is aligned with the axis; and
   the other of the anchor element and the rotating element comprises a connecting structure extending along the axis and through the aperture.

8. The fixing device of claim 1, wherein the rotating element has a width and a length, each being in directions substantially perpendicular to the axis and each other;
   the rotating element width is less than or equal to a predetermined width; and
   the rotating element length is greater than the predetermined width.

9. The fixing device of claim 8, wherein the anchor element has a width in a direction perpendicular to the axis, the anchor element width being less than or equal to the predetermined width.

10. The fixing device of claim 1, wherein:
    the anchor element and rotating element are able to move away from one another along the axis; and
    the fixing device further comprises a return mechanism adapted to convert movement of the anchor element and rotating element away from one another into sloping movement in a second direction along and about the axis.

11. The fixing device of claim 10, further comprising an outer element fixedly connected to the anchor element and spaced along the axis therefrom, the rotating element being arranged therebetween;
    wherein the return mechanism comprises a first return portion on the outer, and a second return portion on the engaging; and
    at least one of the first and second return portions is a sloping surface and the other is shaped to be able to roll, slide or otherwise move therealong.

12. The fixing device of claim 10, wherein:
    the rotating element comprises a threaded bore configured to receive a threaded fastener; and
    the return structure comprises a friction element within the threaded bore that is adapted to catch against the threaded fastener.

13. The fixing device of claim 1, wherein a longitudinal end of the anchor element is adapted to receive and interface with a longitudinal end of the anchor element of an adjacent fixing device.

14. The fixing device of claim 1, wherein the deployment mechanism is a rigid mechanism and does not comprise a spring element.

15. A fixing device for fixing an article to a first side of a slot formed by substantially opposing flanges, the fixing device comprising:
an anchoring element configured to sit within the slot and between the opposing flanges; and
a rotating element that is rotatable with respect to the anchor element, the rotating element being configured to be positioned on a second side of the slot and rotate about an axis substantially perpendicular to the opposing flanges;
wherein the anchor element and rotating element each have a width less than or equal to a width of the slot, and the rotating element has a length greater than the width of the slot;
the anchor element and rotating element are able to move towards one another in a tightening movement along the axis;
the fixing device is shiftable between an insertion configuration in which the anchor element and rotating element are arranged such that their widths are aligned, and a deployed configuration in which the rotating element is rotated away from alignment with the anchor element; and
the fixing device further comprises a deployment mechanism configured to convert the tightening movement between the rotating element and the anchor element into rotation of the rotating element towards the deployed configuration.

16. The fixing device of claim 15, wherein in the deployed configuration, an outer surface of the anchor element is substantially flush with a surface of the opposing flanges on the first side of the slot;
such that the opposing flanges of the slot are gripped between a surface of the article and the rotating element.

17. The fixing device of claim 15, wherein upon shifting into the deployed configuration, the anchor element engages with the rotating element and prevents rotation thereof in a return direction.

18. The fixing device of claim 15, wherein the deployment mechanism comprises a first deployment portion on an inner side of the anchor element, and a second deployment portion on a side of the rotating element facing the anchor element; and
upon inducement of the tightening movement the first and second deployment portions urge against one another, thereby converting the tightening movement between the rotating element and the anchor element into rotation of the rotating element towards the deployed configuration.

19. The fixing device of claim 18, wherein one of the first deployment portion and the second deployment portion is a ramp, and the other is a compatible element configured to slide, roll or otherwise move along the ramp.

20. The fixing device of claim 19, wherein the ramp is a helical cam.

21. The fixing device of claim 20, further comprising a locking structure, wherein when the rotating element is rotated to a predetermined angle, the locking structure engages therewith to prevent rotation of the rotating element back towards the insertion configuration.

22. The fixing device of claim 21, wherein the locking structure comprises a locking recess on one of the rotating element and the anchor element and a locking region on the other, the locking region shaped to be received by the locking recess;
at the predetermined angle, the locking region is positioned at an entrance to the locking recess; and
further tightening movement urges the locking region into the locking recess.

23. The fixing device of claim 15, further comprising a return mechanism configured to convert a loosening movement between the rotating element and the anchor element into rotation of the rotating element towards the insertion configuration.

24. The fixing device of claim 23, wherein:
the fixing device further comprises an outer element fixedly connected to the anchor element, the rotating element being arranged therebetween;
the return mechanism comprises a first return portion on an inner side of the bottom element, and a second return portion on a side of the rotating element facing the outer element; and
the first return portion urges against the second return portion so as to convert the loosening movement between the rotating element and the anchor element into rotation of the rotating element towards the insertion configuration.

25. The fixing device of claim 24, wherein one of the first return portion and the second return portion is a ramp, and the other is a compatible element configured to slide, roll or otherwise move along the ramp.

26. The fixing device of claim 25, wherein the ramp is a helical cam.

27. The fixing device of claim 23, wherein:
the rotating element comprises a threaded bore configured to receive a threaded fastener; and
the return mechanism comprises a friction element within the threaded bore configured to catch against the threaded fastener.

28. The fixing device of claim 27, wherein the deployment mechanism comprises a ramp and a compatible element configured to slide, roll or otherwise move along the ramp; and
upon the threaded fastener being rotated to loosen the fixing device, the friction element transmits the rotation of the threaded fastener into the rotating element, thereby urging the compatible element in a reverse direction along the ramp.

29. The fixing device of claim 23, wherein the return mechanism comprises a spring element that extends between the anchor element and the rotating element;
the spring element is placed under one of compression or tension by the tightening movement; and
the loosening movement induces releasing of said compression or tension against the rotating element.

30. The fixing device of claim 15, further comprising at least one longitudinal engaging portion on an end of the anchor element;
the longitudinal engaging portion being configured to engage with a longitudinal engaging portion of an adjacent further fixing device that is within the channel.

31. A method of fixing an article to a slot having a slot width and being formed by substantially opposing flanges, the slot and flanges having a first side and a second side, the method comprising the steps of:
I) providing a fixing device comprising an anchor element arranged perpendicular to an axis, a rotating element mechanically connected thereto and rotatable about the axis, and a deployment mechanism;

II) inserting the fixing device in an insertion configuration through the slot from the first side and at least partially to the second side; and III) inducing the anchor element and rotating element to move towards one another along the axis;

wherein the anchor element and rotating element have widths less than or equal to the slot width, and the rotating element has a length greater than the slot width;

the insertion configuration comprises the anchor element and rotating element being arranged along the axis such that their widths are aligned; and the deployment mechanism is adapted to convert movement of the anchor element and rotating element towards one another into helical movement in a first-handed direction along and about the axis.

32. The method of claim 31, wherein the connecting structure is a threaded fastener outwardly extending from the article; and each of the anchor element and the rotating element comprise an aperture extending therethrough, the apertures aligned with the axis and configured to receive the threaded fastener.

33. The method of claim 31, wherein the connecting structure is a threaded fastener outwardly extending from the rotating element; and the anchor element comprises an aperture extending therethrough, the aperture aligned with the axis, through which the threaded fastener extends.

* * * * *